United States Patent
Shimotani et al.

(10) Patent No.: US 8,473,204 B2
(45) Date of Patent: *Jun. 25, 2013

(54) MAP DISTRIBUTION SERVER, MAP INFORMATION TERMINAL, AND MAP DISTRIBUTION SYSTEM USING THESE MAP DISTRIBUTION SERVER AND MAP INFORMATION TERMINAL

(75) Inventors: Mitsuo Shimotani, Tokyo (JP); Makoto Mikuriya, Tokyo (JP); Takashi Tamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/485,137

(22) Filed: May 31, 2012

(65) Prior Publication Data

US 2012/0239736 A1     Sep. 20, 2012

Related U.S. Application Data

(60) Division of application No. 13/145,318, filed on Jul. 19, 2011, now Pat. No. 8,214,145, which is a continuation of application No. PCT/JP2009/006307, filed on Nov. 24, 2009.

(30) Foreign Application Priority Data

Mar. 4, 2009   (JP) ................................. 2009-050730

(51) Int. Cl.
*G06F 15/16*    (2006.01)
*G01C 21/00*    (2006.01)

(52) U.S. Cl.
USPC ........... 701/451; 701/450; 701/461; 701/462; 340/995.14

(58) Field of Classification Search
USPC ................. 701/400, 408, 409, 410, 411, 412, 701/418, 420, 425, 430, 431, 439, 450, 451, 701/461, 462, 463; 340/995.1, 995.11, 995.12, 340/995.14, 995.18
See application file for complete search history.

(56) References Cited

U.S. PATENT DOCUMENTS

| 7,554,462 B2 | 6/2009 | Mori |
| 7,739,037 B2 | 6/2010 | Sumizawa et al. |
| 2006/0095202 A1 | 5/2006 | Atarashi et al. |

FOREIGN PATENT DOCUMENTS

| JP | 2002-7440 A | 1/2002 |
| JP | 2005-147713 A | 6/2005 |
| JP | 2006-126683 A | 5/2006 |
| JP | 2007-271432 A | 10/2007 |
| JP | 2008-14681 A | 1/2008 |

*Primary Examiner* — Richard M. Camby
(74) *Attorney, Agent, or Firm* — Birch, Stewart, Kolasch & Birch, LLP

(57) ABSTRACT

A map distribution system that implements navigation using desired map data in which the degree of reliability of information about an object, such as a road or a facility, is taken into consideration is provided. A map distribution server 1a creates distribution data including difference map data and a reliance status showing the degree of reliability of the difference map data as a reply to edit request information about an edit request made by a user, and a map information terminal 3 receives the distribution data via a communication network 2 and performs navigation according to the reliance status included in the distribution data.

11 Claims, 12 Drawing Sheets

FIG.3

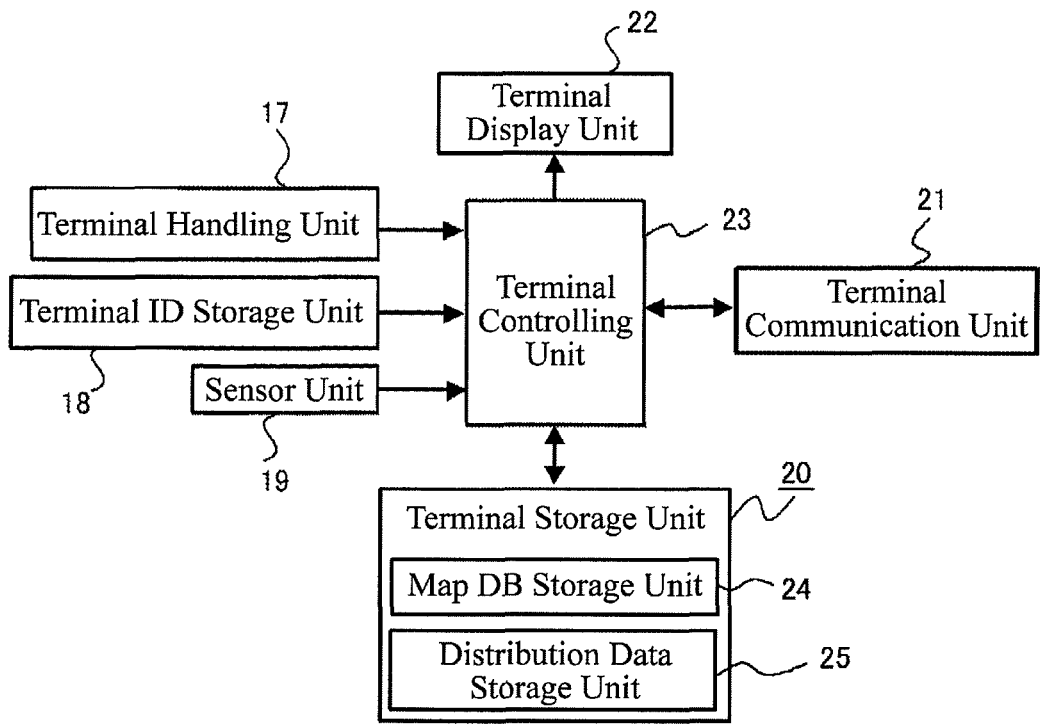

FIG.4

| Terminal ID Information: Terminal ID Number and Encryption Key |  |
|---|---|
| Map Version | |
| Object Type: Road, Facility | |
| Edit Information: Addition, Deletion, Change | |
| Object Data : | Road<br>  Sequence of Road Shape<br>  Coordinate Points,<br>  Connection Information about<br>  Connection with Existing Roads<br>  Link Number etc.<br><br>Facility<br>  Name and Position of<br>  Existing Facility<br>  Icon etc. |

(a)

| Terminal ID Information |
|---|
| Map Version |
| Object Type |
| Edit Information |
| Difference Map Data |
| Reliance Status |

(b)

FIG.5
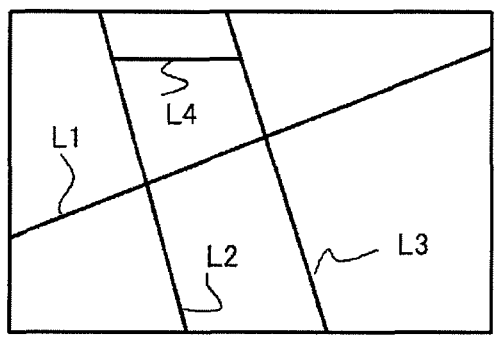
(a)
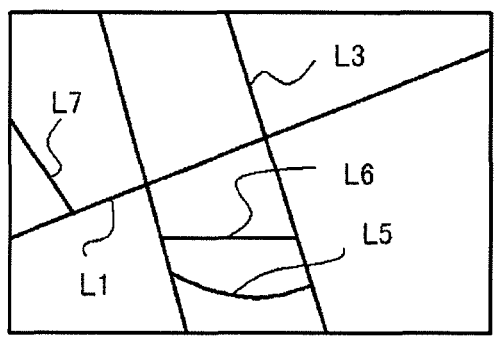
(b)
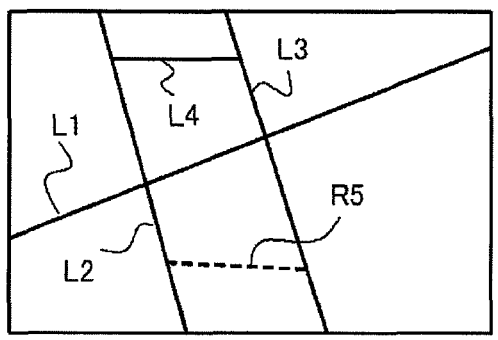
(c)
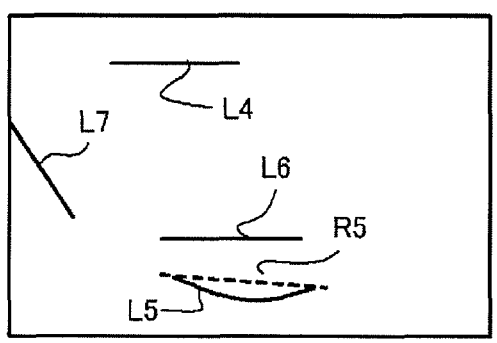
(d)
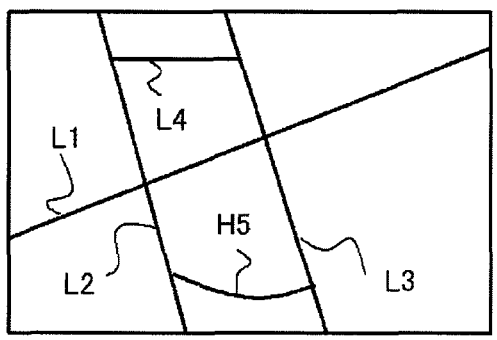
(e)

FIG.8
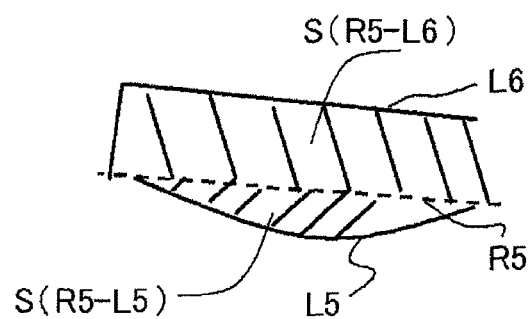
FIG.9
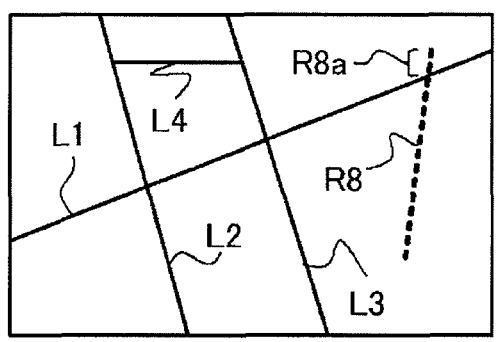
(a)
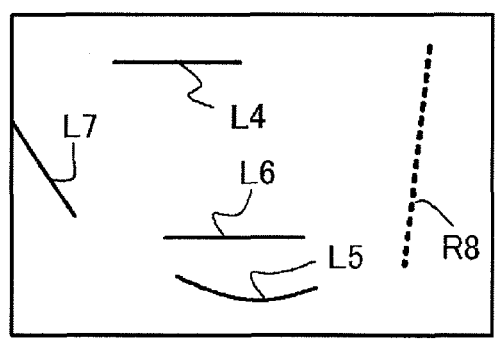
(b)
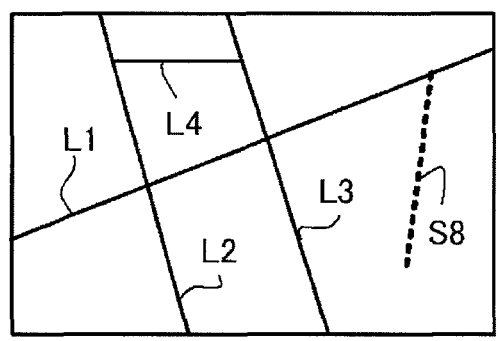
(c)
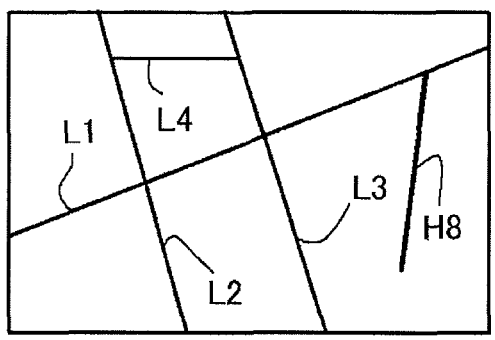
(d)

FIG.11
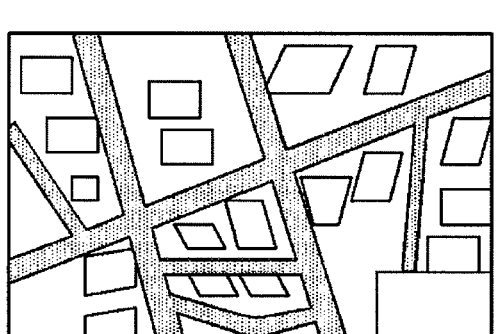
(a)
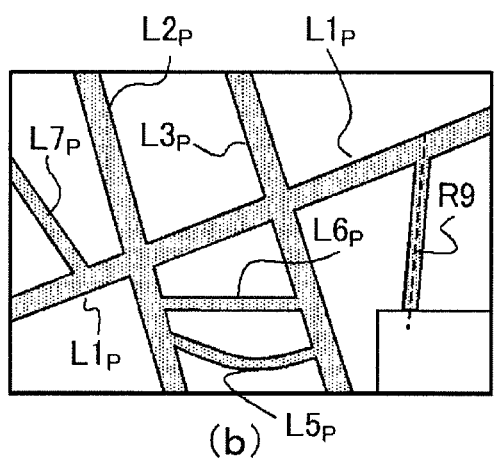
(b)
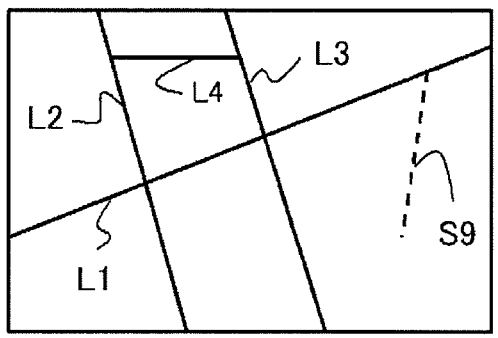
(c)
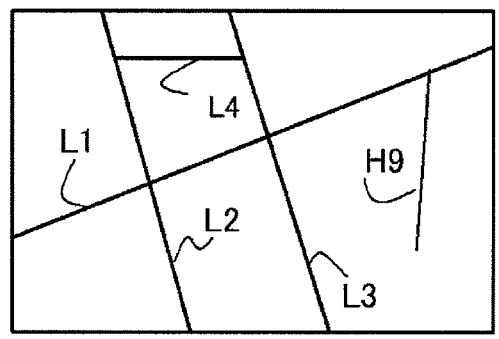
(d)

MAP DISTRIBUTION SERVER, MAP INFORMATION TERMINAL, AND MAP DISTRIBUTION SYSTEM USING THESE MAP DISTRIBUTION SERVER AND MAP INFORMATION TERMINAL

CROSS REFERENCE TO RELATED APPLICATION

This application is a Divisional of U.S. application Ser. No. 13/145,318 filed on Jul. 19, 2011 now U.S. Pat. No. 8,214,145, which is a continuation application of PCT/JP2009/006307 filed on Nov. 24, 2009, which claims priority from Japanese Patent Application No. 2009-050730 filed on Mar. 4, 2009. The entire contents of all of the above applications are hereby incorporated by reference.

FIELD OF THE INVENTION

The present invention relates to a map distribution server and a map information terminal which enable a user to acquire desired map information, and a map distribution system using these map distribution server and map information terminal.

BACKGROUND OF THE INVENTION

In a conventional map distribution system, a mobile terminal which is a map information terminal sends road shape data to a center server which is a map distribution server, and the center server updates map information stored in a map database by using the road shape data sent thereto (for example, refer to patent reference 1).

In another conventional map distribution system, when a vehicle driven by a user of a map information terminal travels along a road which does not exist in the map data held by the map information terminal, the map information terminal transmits the traveling path of the vehicle to a center server, and the center server updates the map information of the map database held thereby according to the traveling path. After that, according to the circumstances, the center server distributes difference data which the center server has created according to the map information of the updated map database to the map information terminal (for example, refer to patent reference 2).

Even any of the above-mentioned map distribution systems can distribute map data which the user desires as difference data to enable the map information terminal owned by the user to acquire the distributed difference data when the map information of the map distribution server is correctly updated on the basis of data about the traveling path of the vehicle and when there are data about a traveling path which were acquired when someone actually traveled along the road once.

RELATED ART DOCUMENT

Patent Reference

Patent reference 1: JP, 2002-007440,A (see pp. 8 and FIG. 4)
Patent reference 2: JP, 2008-014681,A (see pp. 11-12 and FIG. 7)

SUMMARY OF THE INVENTION

Problems to be Solved by the Invention

However, in a map distribution system consisting of a conventional map distribution server and a conventional map information terminal, when receiving road information about a road from the map information terminal, the map distribution server updates the map information of the map database thereof regardless of whether or not the road information is reliable. Therefore, a problem is that the user of the map information terminal which receives distribution data which the map distribution server has created according to the above-mentioned map information cannot know whether or not the distribution data are reliable.

Furthermore, even if the user desires to individually get original map data for the map terminal information, the original map data including a required particular road, the map distribution server cannot distribute the original map data for the map terminal information including the particular road when the particular road shown by map data sent from the map information terminal to the map distribution server is not included in the map information of the map database held by the map distribution server.

The present invention is made in order to solve the above-mentioned problems, and it is therefore an object of the present invention to provide a map distribution server which can create desired map data for information terminals in which the degree of reliability of information about an object, such as a road or a facility, is taken into consideration, a map information terminal which can use the map data, and a map distribution system using these map distribution server and map information terminal.

Means for Solving the Problem

In accordance with the present invention, there is provided a map distribution server including: a receiving unit for receiving a distribution request including edit request information about an edit request made by a user and a version of terminal map information held by a map information terminal from the above-mentioned map information terminal; a first map information storage unit for holding a plurality of pieces of already-released first map information; a second map information storage unit for holding second map information which has not been released yet and is most up to date; a first comparing unit for extracting first map information of the same version as the above-mentioned terminal map information from among the above-mentioned plurality of pieces of first map information, and for making a comparison with the edit request information included in the above-mentioned distribution request by using the above-mentioned extracted first map information and the above-mentioned second map information to output a first comparison result; a creating unit for creating difference map data according to the above-mentioned distribution request on the basis of the above-mentioned first comparison result and the above-mentioned first map information of the same version; a reliance status setting unit for setting a reliance status showing the degree of reliability of the above-mentioned difference map data according to the above-mentioned first comparison result, and a transmitting unit for transmitting distribution data including the above-mentioned difference map data and the above-mentioned reliance status to the above-mentioned map information terminal.

Furthermore, in accordance with the present invention, there is provided a map information terminal including: a terminal map information storage unit for storing terminal map information; a terminal handling unit for inputting edit request information about a request to edit the above-mentioned terminal map information; a transmitting unit for transmitting the inputted edit request information to a distribution server; a receiving unit for receiving, as a reply to the above-mentioned edit request information transmitted to the distribution server, distribution data including difference map data which are difference data corresponding to the above-mentioned terminal map information, and a reliance status showing the degree of reliability of the above-mentioned difference map data from the map distribution server; an updating unit for making a differential update of the above-mentioned terminal map information according to the difference map data included in the above-mentioned distribution data; and a navigation unit for carrying out navigation according to the reliance status included in the above-mentioned distribution data.

Furthermore, in accordance with the present invention, there is provided a map distribution system including a map information terminal for transmitting edit request information about an edit request made by a user and receiving distribution data as a reply to the above-mentioned edit request information via a communication network, and a map distribution server for receiving the above-mentioned edit request information via the above-mentioned communication network, and for transmitting the above-mentioned distribution data including difference map data created thereby according to the above-mentioned edit request information to the above-mentioned map information terminal, wherein the above-mentioned edit request information includes a version of terminal map information held by the above-mentioned map information terminal while the above-mentioned distribution data also include a reliance status showing the degree of reliability of the difference data included therein.

Advantages of the Invention

Because the map distribution server in accordance with the present invention is constructed in such a way as to transmit the distribution data including the difference map data according to the distribution request which is the edit request information about the edit request made by the user and which is received from the map information terminal, and the reliance status showing the degree of reliability of the difference map data to the map information terminal, the map distribution server in accordance with the present invention can create the distribution data in which the degree of reliability of information about an object, such as a road or a facility, is taken into consideration, and which correspond to the distribution request from the information terminal, and can distribute the distribution data to the map information terminal.

Furthermore, because the map information terminal in accordance with the present invention is constructed in such a way as to receive the distribution data including the difference map data and the reliance status showing the degree of reliability of the difference map data, as a reply to the edit request information about the edit request made by the user transmitted to the map distribution server, from the map distribution server, and use the distribution data, the map information terminal in accordance with the present invention can use the desired map data in which the degree of reliability of information about an object, such as a road or a facility, is taken into consideration for navigation.

Furthermore, the map distribution system in accordance with the present invention is constructed in such a way that the map distribution server creates the distribution data including the difference map data and the reliance status showing the degree of reliability of the difference map data as a reply to the edit request information about the edit request made by the user, and the map information terminal uses the distribution data, the map distribution system in accordance with the present invention can implement navigation in which the degree of reliability of information about an object, such as a road or a facility, is taken into consideration.

BRIEF DESCRIPTION OF THE FIGURES

FIG. 3 is a block diagram for explaining the structure of a map information terminal 3 in more detail;

FIG. 4 is a data structure diagram for explaining the data structure of a distribution request and the data structure of distribution data;

FIG. 5 is a view showing an example of maps which are based on map information held by the map information terminal 3 and map information held by the map distribution server 1a in the map distribution system in accordance with Embodiment 1 of the present invention;

FIG. 8 is an explanatory drawing for explaining an example of determination logic about calculation of a matching degree with a road R5 to be added;

FIG. 9 is a view of another example of maps for explaining the operation of the map information terminal 3 and the operation of the map distribution server 1a in the map distribution system in accordance with Embodiment 1 of the present invention;

FIG. 11 is a view of an example of maps based on map information held by a map information terminal 3 holds and map information held by the map distribution server 1b, and an example of photographic images, such as aerial photographs or satellite photographs, in an extended map DB related to map information;

EMBODIMENTS OF THE INVENTION

Hereafter, the preferred embodiments of the present invention will be explained in detail with reference to the drawings.

Embodiment 1

Figure 1:
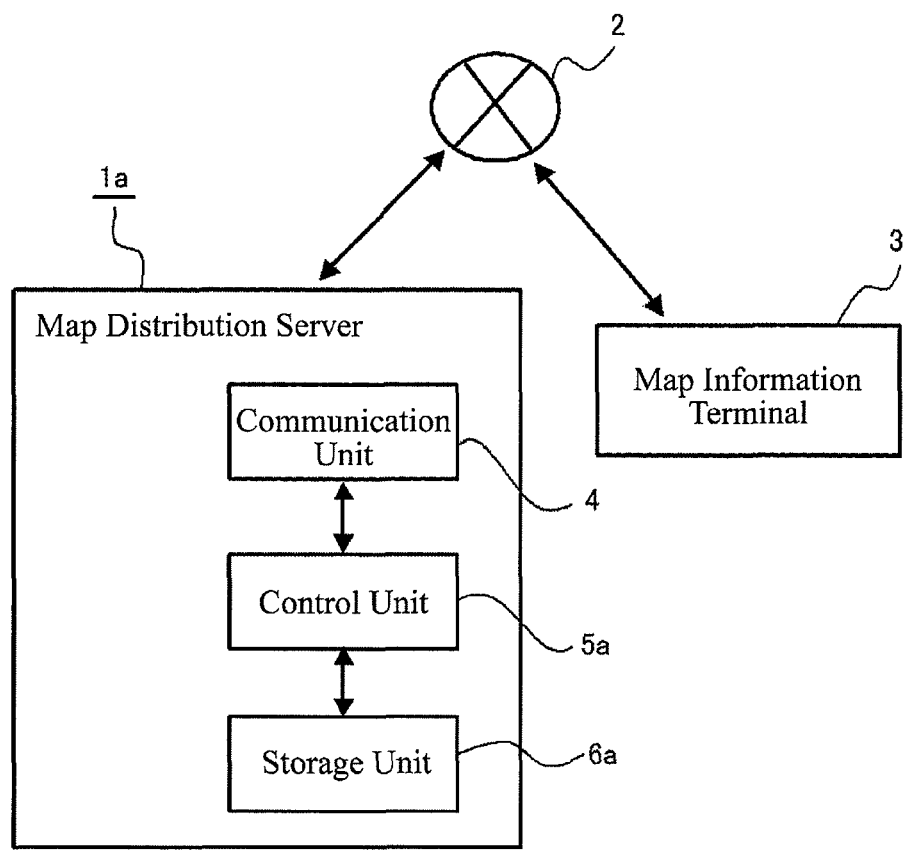
FIG. 1 is a block diagram showing the whole of a map distribution system in accordance with Embodiment 1 of the present invention.

FIG. 1 is a block diagram showing the whole of a map distribution system in accordance with Embodiment 1 of the present invention. The map distribution system is comprised of a map distribution server 1a for receiving a distribution request which is edit request information about an edit request made by a user, and for creating and distributing difference map data according to the distribution request, a communication network 2 for carrying out communication transmission of the difference map data distributed thereto, and a map information terminal 3 for receiving the difference map data which are communication-transmitted thereto via the communication network 2, and for updating map information (terminal map information) held thereby by using the difference map data.

The map information terminal 3 is a car navigation terminal device which is used by a user while being mounted in a vehicle which the user gets on, for example. By using this map information terminal 3, the user can check the current position of the vehicle and the destination to which the user is going to go from now on on a map, and can also acquire information about roads on a route extending from the current position to the destination, and facilities in an area surrounding the vehicle.

In FIG. 1, although only the single map information terminal 3 is shown, in addition to this specific map information terminal 3 being mounted in the vehicle, a map information terminal (not shown) is mounted in each of vehicles which a plurality of other users get on, respectively, and each of the map information terminals (not shown) can communicate with the map distribution server 1a via the communication network 2.

As shown in FIG. 1, the map distribution server 1a is comprised of a communication unit 4 capable of carrying out transmission and reception of data by communicating with the map information terminal 3 via the communication network 2, a control unit 5a for controlling the reception of a distribution request from the map information terminal 3 and the distribution of difference map data to the map information terminal 3 by using the communication unit 4, and a storage unit 6a for holding various map databases (abbreviated as map DBs from here on) for holding pieces of map information required for creation of the difference map data distributed to the map information terminal, and terminal information about the map information terminal 3, etc.

Figure 2:
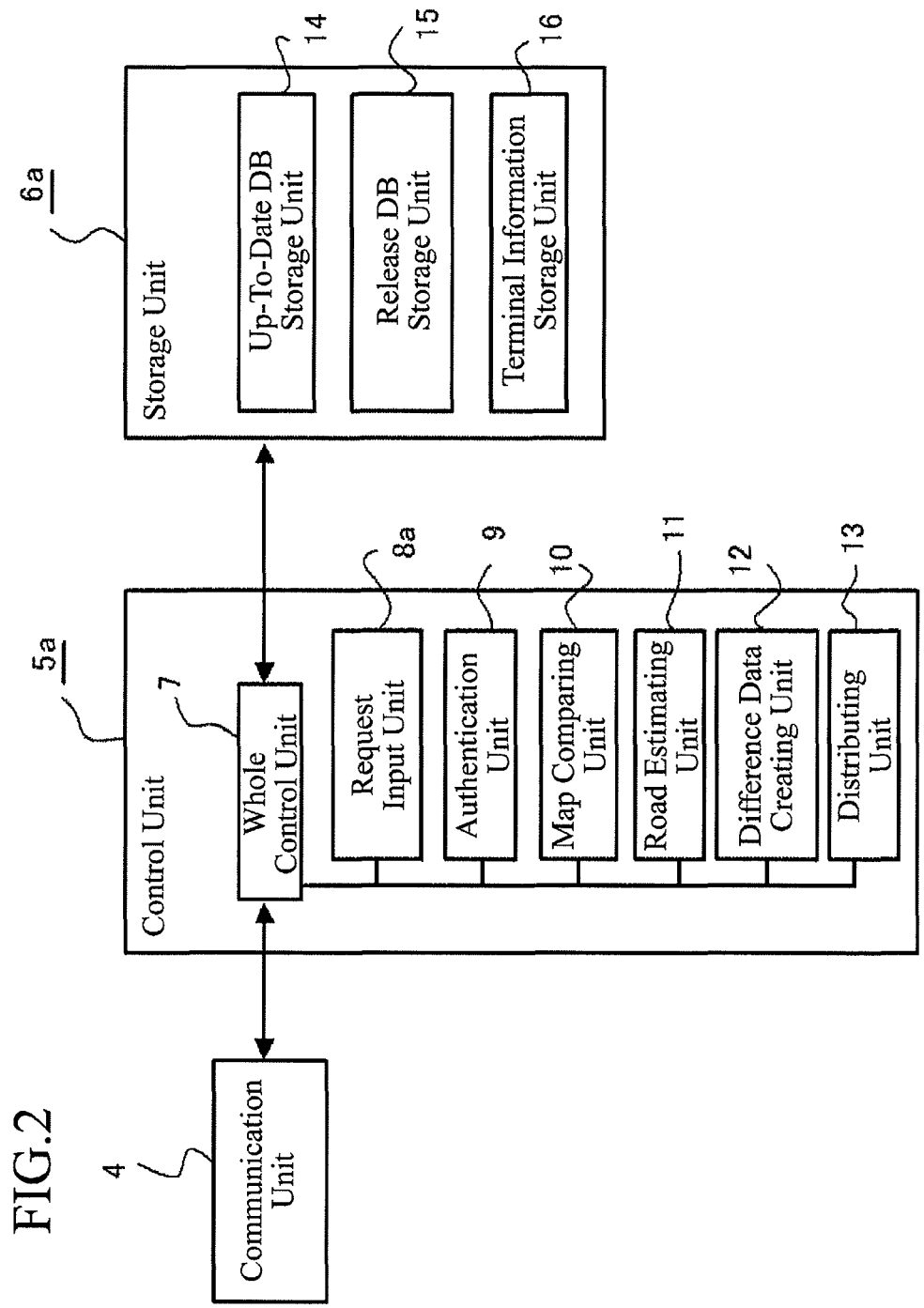
FIG. 2 is a block diagram for explaining the structure of a map distribution server 1a in more detail.

FIG. 2 is a block diagram for explaining the structure of the map distribution server 1a of FIG. 1 in more detail. Furthermore, because the same reference numerals as those shown in FIG. 1 denote the same components or like components, the explanation of the components will be omitted hereafter.

As shown in FIG. 2, the control unit 5a is comprised of a whole control unit 7 for carrying centralized control of the whole of the map distribution server 1a, a request input unit 8a for receiving a distribution request to add a road, for example, from the map information terminal 3 which is transmitted thereto via the communication network 2 and the communication unit 4, an authentication unit 9 for determining whether or not the map information terminal 3 which has sent the distribution request is a terminal own by a user with which a contract has been made, a map comparing unit 10 for comparing the road for which the distribution request has been sent by the map information terminal 3 with the terminal map information which is the map information of the map DB held by the storage unit 6a, a road estimating unit 11 for carrying out an estimation process for transforming the road for which the distribution request has been sent into an appropriate road to transform the road, for which the distribution request has been sent, according to a result estimated through the estimation process as needed, a difference data creating unit 12 which is a creating unit for creating difference data about the difference between the map information held by the map information terminal 3 and the map information to which the road acquired by the road estimating unit 11 is added, for example, and a distributing unit 13 for distributing the distribution data which are the map data corresponding to the distribution request from the map information terminal 3 via the communication unit 4 and the communication network 2.

Furthermore, as shown in FIG. 2, the storage unit 6a is comprised of a release DB (database) storage unit 15 which is a first map information storage unit for storing a map DB holding pieces of map information which the map distribution server 1a released to the map information terminal 3 in the past, an up-to-date DB (database) storage unit 14 which is a second map information storage unit for storing a map DB holding the map information reflecting the most up-to-date road information falling within a limit which the map distribution server can grasp, and a terminal information storage unit 16 for storing the terminal information about the map information terminal 3, registration information about the user of this map information terminal 3, etc. While the release DB storage unit 15 has the pieces of map information which were released to the map information terminal 3 in the past, the up-to-date DB storage unit 14 may also have map information which has not been released to the map information terminal 3 yet at the current time according to the time when the map information is released.

FIG. 3 is a block diagram for explaining the structure of the map information terminal 3 of FIG. 1 in more detail.

As shown in FIG. 3, the map information terminal 3 is comprised of a terminal handling unit 17 including a touch panel or a remote controller for allowing the user to perform an operational input, a terminal ID storage unit 18 for storing terminal ID information specific to the map information terminal 3 owned by the user, a sensor unit 19 including a unit, such as a GPS (Global Positioning System) receiver, for measuring the current position of the vehicle which the user is riding, a gyro sensor for detecting the heading of the vehicle, and a speed sensor for detecting the traveling speed of the vehicle according to an external signal, such as a vehicle speed pulse sent from the vehicle, a terminal storage unit 20 for storing information required in order to carry out navigation of the vehicle in which the map information terminal 3 is mounted by using the distribution data distributed from the map distribution server 1a, a terminal communication unit 21 for transmitting a distribution request to the map distribution server 1a, and receiving the distribution data, and a terminal display unit 22 for displaying an operation screen which allows the user to operate the terminal handling unit 17 to send the distribution request to the map distribution server 1a, and also displaying a navigation screen created by using map information included in a map DB stored in a map DB storage unit 24.

The terminal storage unit 20 of FIG. 3 is comprised of the map DB storage unit 24 for storing the map DB which is formed into a database in such a way as to include the terminal map information which is the map information which is used in order for the map information terminal to carry out navigation of the vehicle, and a distribution data storage unit 25 for storing the distribution data distributed thereto from the map distribution server 1a in response to the distribution request from the map information terminal 3, and also stores a navigation program for carrying out navigation of the vehicle, an update program for updating the map DB by using the distribution data, etc. The map DB storage unit 24 is a terminal map information storage unit for storing the terminal map information.

Next, the data structure of the distribution request transmitted from the map information terminal 3 to the map distribution server 1a via the communication network 2 and the data structure of the distributed data transmitted from the map distribution server 1a to the map information terminal 3 via the communication network 2 will be explained with reference to FIG. 4.

FIG. 4(a) shows the data structure of the distribution request transmitted from the map information terminal 3 to the map distribution server 1a via the communication network 2. The distribution request can consist of terminal ID information, a map version, an object type, edit information, and object data.

The object ID information has information about the ID number specific to the map information terminal 3, an encryption key, etc. Furthermore, the map version is the version number of the map DB which the map information terminal 3 stores in the map DB storage unit 24, and the date when the map was released can be specified from this map version.

In addition, the object type shows the type of the object for which the edit request has been made, such as a road or facility type, in the terminal map information of the map DB stored in the map DB storage unit 24. For example, when a change is made to a road in the map information of the map DB stored by the map DB storage unit 24, the object type is set to the road one, whereas when a change is made to a facility in the map information of the map DB, the object type is set to the facility one.

Furthermore, the edit information shows what kind of edit is to be performed concretely when editing the map information held by the map DB stored in the map DB storage unit 24. For example, information showing whether to add a road or facility, delete a road or facility, or change a road or facility to another road or facility is specified as the edit information.

When the object type is the road one, the object data include the sequence of road shape coordinate points of the road which is the target to be edited, the connection information about connection with existing roads, and the link number of the road. When the object type is the facility one, the object data include data about the name and position of the existing facility which is the target to be edited, and icon data.

FIG. 4(b) shows the data structure of the distribution data which are transmitted and distributed from the map distribution server 1a to the map information terminal 3 via the communication network 2 in response to the distribution request from the map information terminal 3. The distribution data can consist of terminal ID information, a map version, an object type, edit information, difference map data, and a reliance status.

The terminal ID information includes a specific terminal ID for specifying the map information terminal 3 which has transmitted the distribution request, and an encryption key, and is the same as that included in the distribution request shown in FIG. 4(a). Depending upon an encryption method used, the terminal ID information includes an encryption key which the map information terminal 3 uses to authenticate the map distribution server 1a.

Furthermore, the map version is the same as the version information of the map information held by the map DB stored in the map DB storage unit 24 in the map information terminal 3 which has transmitted the distribution request.

The map distribution server 1a refers to the map version shown in the distribution request transmitted thereto from the map information terminal 3, selects the map information corresponding to the map version shown in the distribution request from the release DB storage unit 15 which constructs the storage unit 6a, and then edits the map information selected thereby according to the distribution request. After that, the map distribution server 1a transmits the distribution data edited thereby to the map information terminal 3 which has transmitted the distribution request thereto.

More specifically, the map distribution server 1a needs to accept the distribution request not only from the specific map information terminal 3 which has transmitted the distribution request, but also from another map information terminal (not shown), and needs to transmit distribution data which the map distribution server has edited to the other map information terminal.

Therefore, in order to manage the map information for each of the plurality of map information terminals while bringing the map information into correspondence with each of the plurality of map information terminals, the map distribution server 1a needs to identify which map information is associated with each of the plurality of map information terminals by using the pieces of map information and the map versions in the map DB stored in the release DB storage unit 15. To this end, in each map information terminal 3, the map information acquired by updating the map information of the map DB of the map DB storage unit 24 using the distribution data from the map distribution server 1a is set to have the same map version as the yet-to-be-edited map information for the purpose of management.

Needless to say, in order to discriminate the yet-to-be-edited map information from the edited map information, additional information for discrimination between them can be added to the map version in the map information terminal 3.

The object type and the edit information are the same as the object type and the edit information which are included in the distribution request which the map information terminal 3 has transmitted, respectively.

The difference map data are the data about the difference between the map data which are created, in response to the distribution request from the map information terminal 3, by editing the map information of the map DB which has the same map version as the map information of the map DB stored in the map DB storage unit 24 of the map information terminal 3 and which is stored in the release DB storage unit 15 of the map distribution server 1a, and the map data based on the yet-to-be-edited map information similarly having the same map version as the map information of the map DB stored in the map DB storage unit 24.

The reliance status is set up by the map distribution server 1a according to the result of the comparison process carried out by the map comparing unit 10 in the control unit 5a, and shows the degree of reliability of the map data which the map distribution server 1a has created by editing the map information of the map DB in response to the distribution request from the map information terminal 3.

Next, the operation of the map distribution server 1a and the operation of the map information terminal 3 in the map distribution system in accordance with Embodiment 1 of the present invention will be explained in detail.

The map information terminal 3 carries out a map display, a location, a route search, route guidance, a facility search, etc. according to map information held by the map DB of the map DB storage unit 24 of the terminal storage unit 20. The user can use the map information terminal 3 by performing one of various operations on the map information terminal while watching a screen display created by the terminal display unit 22. Hereafter, it is assumed that the map DB storage unit 24 of the map information terminal 3 stores a map DB including map information of map version of Ver1.0 (released in May, 2006), for example.

FIG. 5 shows an example of maps which are based on the map information held by the map information terminal 3 and the map information held by the map distribution server 1a, for explaining the operation of the map information terminal 3 and the operation of the map distribution server 1a in the map distribution system in accordance with Embodiment 1 of the present invention. For example, it is assumed that the map information held by the map DB of the map DB storage unit 24 of the terminal storage unit 20 of the map information terminal 3 corresponds to a map as shown in FIG. 5(a). In the map of FIG. 5(a), L denotes a road and a numeral placed behind L shows the number of the road. More specifically, L1 denotes a road whose road number is 1.

On the other hand, it is assumed that the up-to-date DB storage unit 14 of the storage unit 6a of the map distribution server 1a stores a map DB including the most up-to-date map information whose map version is Ver2.0 (released in October, 2008), as shown in FIG. 5(b), for example. Compared with the map based on the map information of version of Ver1.0 held by the map information terminal 3, a road L4 is removed from the map based on the most up-to-date map information of the map distribution server 1 while roads L5, L6, and L7 are added to the map based on the most up-to-date map information of the map distribution server 1.

In addition, FIG. 5(c) shows a map for explaining a process of creating a distribution request to add a new road R5 to the map based on the map information shown in FIG. 5(a) of the map information terminal 3, which is carried out when the user operates the terminal handling unit 17 of the map information terminal 3 to perform a drawing operation using a cursor, for example.

Furthermore, FIG. 5(d) shows a view in which the road R5 to be added is described additionally with respect to only the changed roads, which are extracted by a comparison between the map based on the map information edited in response to the distribution request from the map information terminal 3 and the map based on the most up-to-date map information stored in the map distribution server 1a shown in FIG. 5(b), in order to compare the road R5 with the changed roads.

In addition, FIG. 5(e) shows a map which is displayed on the terminal display unit 22 according to updated map information which is acquired by updating the map information of the map DB stored in the map DB storage unit 24 by using the distribution data shown in FIG. 4(b) which are transmitted from the map distribution server 3 in response to the distribution request from the map information terminal 3. In FIG. 5(e), a road H5 denotes the road R5 to be added which is determined to be equivalent to the road L5 included in the map information of the map DB stored in the up-to-date DB storage unit 14.

Figure 6:
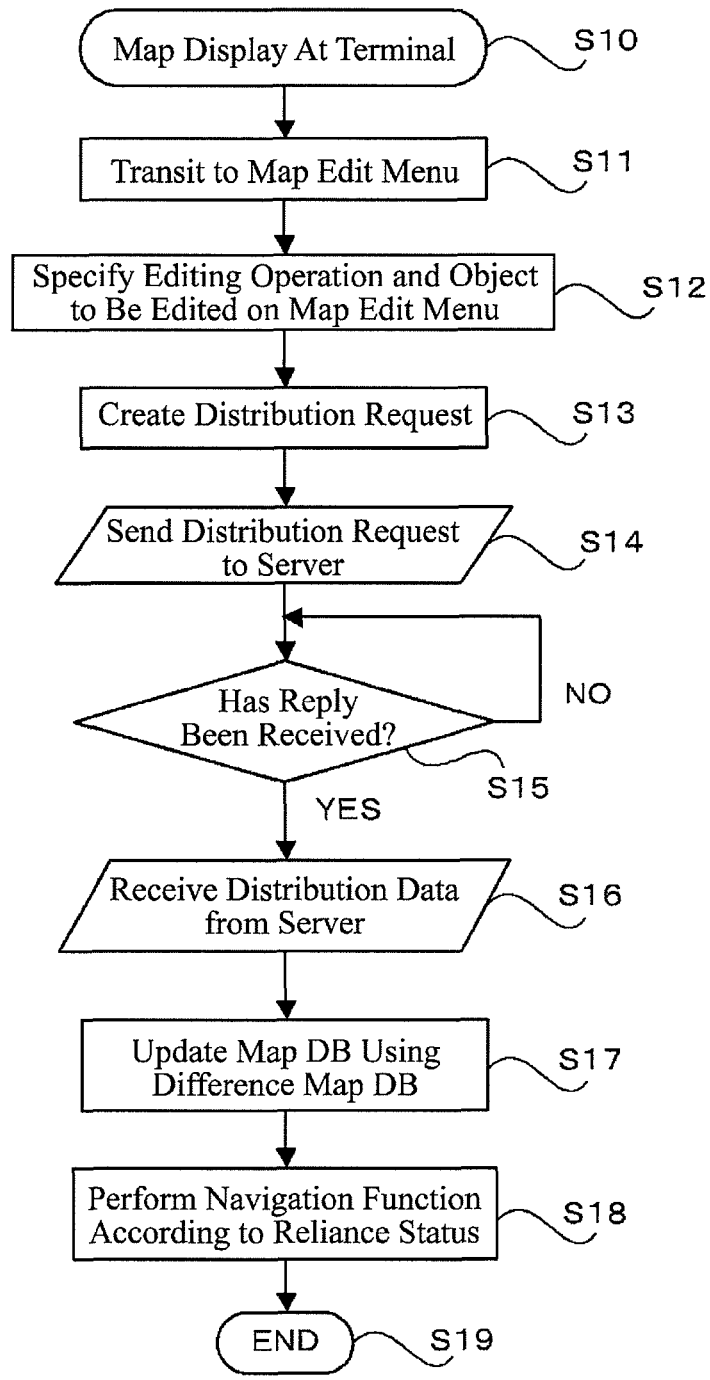
FIG. 6 is an operation flow view for explaining the operation of the map information terminal 3 in the map distribution system in accordance with Embodiment 1 of the present invention.

FIG. 6 is an operation flow view for explaining the operation of the map information terminal 3 in the map distribution system in accordance with Embodiment 1 of the present invention. The operation of the map information terminal 3 in the map distribution system will be explained first with reference to FIGS. 3, 4, 5, and 6.

In the explanation of the operation flow view of the map information terminal 3 of FIG. 6, it is assumed that a map which is created according to the map information of map version of Ver1.0 held by the map DB of the map DB storage unit 24 is displayed on the terminal display unit 22 of the map information terminal 3, as shown in FIG. 5(a) (step S10).

When the user operates the terminal handling unit 17 in order to edit the map, e.g., add his or her desired road, delete a road, or change a road, for example, the terminal display unit 22 makes a transition from the map screen display to a map edit menu screen display (step S11).

The user then operates the terminal handling unit 17 to specify an editing operation and an object to be edited while watching the map edit menu. As the object to be edited, the user can specify a road, a facility, or the like, for example (step S12). As the editing operation, the user can specify addition, deletion, change, or the like of the object to be edited. Concretely, when the user is going to add the road R5 to the map shown in FIG. 5(a), the user performs an operation of adding the road R5 to the map of FIG. 5(a) by performing a drawing operation using a cursor of a pointing device or the like of the terminal handling unit 17, and the map information terminal adds the road R5 to the map as shown in FIG. 5(c). This user's drawing operation causes the user's request to add the information about the road R5 to be inputted to the map information which is the terminal map information held by the map information terminal 3.

In response to the user's request inputted in step S12, the terminal controlling unit 23 of the map information terminal 3 creates a distribution request as shown in FIG. 4(a) (step S13). More specifically, the terminal controlling unit sets the terminal ID number of the map information terminal 3 and an encryption key to the terminal ID information, as shown in FIG. 4(a). The map version is the version of the map information of the map DB stored in the map DB storage unit 24 of the map information terminal 3, and is set to Ver1.0. Furthermore, because the terminal controlling unit adds the road R5, the terminal controlling unit sets the object type to the road one, sets the edit information to addition, and defines, as the object data, the sequence of road shape coordinate points of the road, the connection information about connection with existing roads, the link number of the road, etc.

Next, in order for the map information terminal 3 to send a request of the map distribution server 1a for distribution of a desired map, the terminal communication unit 21 of the map information terminal 3 transmits the distribution request which the terminal controlling unit 23 has created to the map distribution server 1a via the communication network 2 (step S14).

Up to the above-mentioned process is the operation of transmitting the distribution request as shown in FIG. 4(a) to the map distribution server 1a which is carried out by the map information terminal 3.

Figure 7:
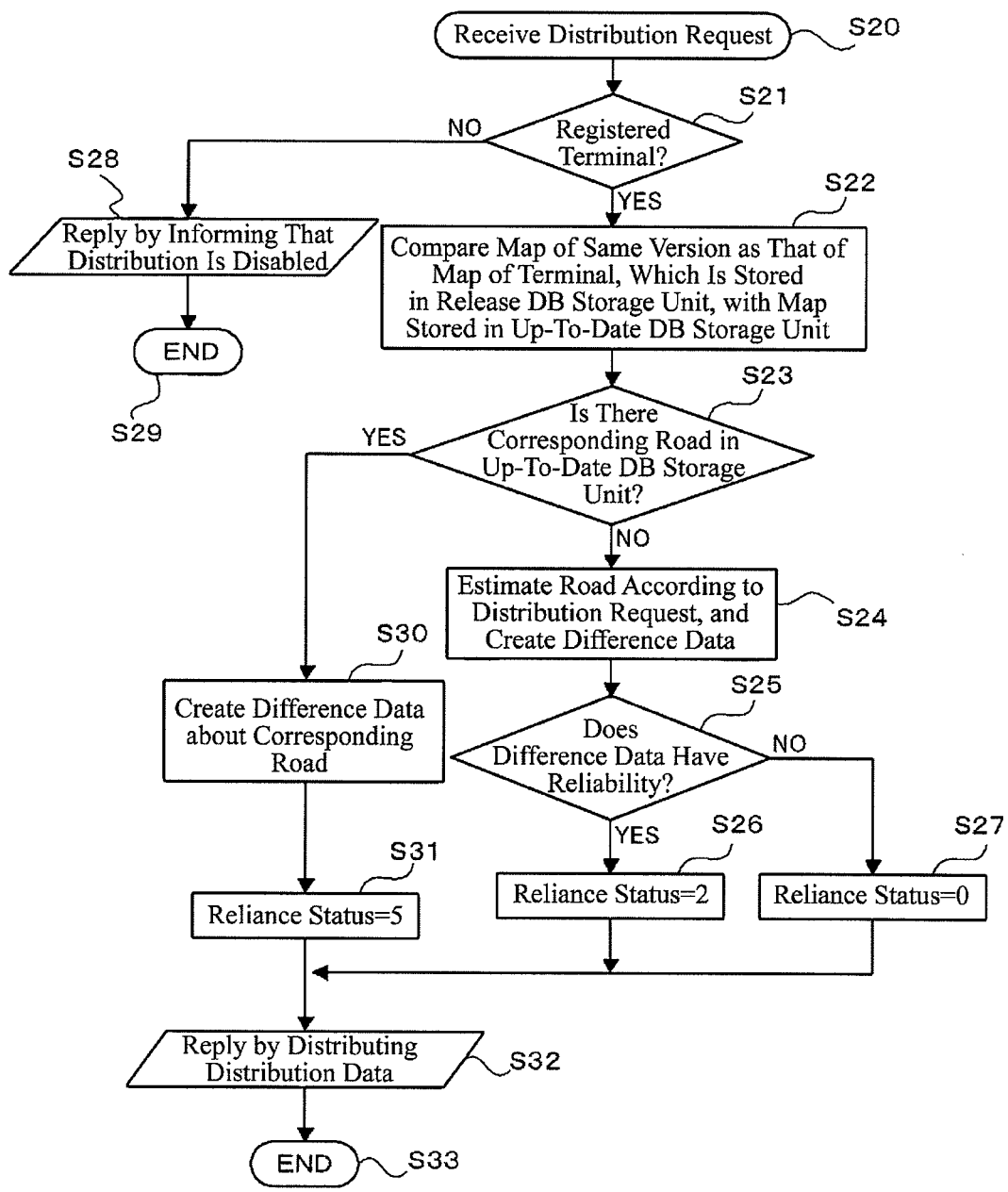
FIG. 7 is an operation flow view for explaining the operation of the map distribution server 1a in the map distribution system in accordance with Embodiment 1 of the present invention.

FIG. 7 is an operation flow view for explaining the operation of the map distribution server 1a in the map distribution system in accordance with Embodiment 1 of the present invention. The operation of the map distribution server 1a which has received the distribution request from the map information terminal 3 will be explained hereafter with reference to FIGS. 2, 4, 5, and 7.

In the explanation of the operation flow view of the map distribution server 1a of FIG. 7, it is assumed that in the map distribution server 1a, a map DB including the most up-to-date map information of map version of Ver2.0 as shown in FIG. 5(b) is stored in the up-to-date DB storage unit 14.

In FIG. 7, the map distribution server 1a receives the distribution request from the map information terminal 3 via the communication unit 4 first (step S20). The received distribution request is accepted by the request input unit 8a of the control unit 5a. The request input unit 8a then replies to the map information terminal 3 that the map distribution server has received the distribution request.

Next, the distribution request accepted by the request input unit 8a is sent to the authentication unit 9, and the authentication unit 9 refers to the terminal ID number and the encryption key of the terminal ID information included in the distribution request shown in FIG. 4(a) to carry out a registration confirmation process of determining whether or not the map information terminal 3 which has sent the distribution request to the map distribution server is a terminal own by a user with which a contract has been made to authenticate whether or not the map information terminal 3 is a registered terminal (step S21).

When the authentication unit, in step S21, determines that the map information terminal 3 is not a registered terminal, the map distribution server 1a describes a reason why the map distribution server cannot distribute any map information and replies to the map information terminal 3 (step S28). In this case, the map distribution server sets a code number showing that the map distribution server cannot distribute any map information to the edit information in the distribution data as shown in FIG. 4(b), for example, and describes the reason why the map distribution server cannot distribute any map information in the difference map data. After the map distribution server makes this reply in this way, the operation flow of the map distribution server 1a is ended (step S29).

In contrast, when the authentication unit, in step S21, determines that the map information terminal 3 is a registered terminal, the map comparing unit 10 compares the road which the map distribution server is requested to distribute by the map information terminal 3 with the map information of the database held by the storage unit 6a. At this time, the map comparing unit 10 operates as a first comparing unit.

Concretely, the map comparing unit 10 selects the map information having the same map version as that specified by the distribution request from the pieces of the map information which are stored in the release DB storage unit 15 and which were released in the past, and then compares the map information selected thereby with the map information of the most up-to-date map DB stored in the up-to-date DB storage unit 15 (step S22).

More specifically, because the map version included in the distribution request is set to Ver1.0, the map comparing unit 10 selects the map information of map version of Ver1.0 from among the pieces of map information stored in the release DB storage unit 15. Next, the map comparing unit 10 compares this map information corresponding to the map of map version of Ver1.0 as shown in FIG. 5(a) with the most up-to-date map information corresponding to the map of map version of Ver2.0 shown in FIG. 5(b) which the map DB stored in the up-to-date DB storage unit 15 includes. As a result, the map comparing unit can extract only the roads which have been changed in the map based on the most up-to-date map information held by the map distribution server 1a with reference to the map based on the map information held by the map information terminal 3.

The map comparing unit compares the roads which were added when the version of the map information was updated from the one of Ver1.0 to the most up-to-date one of Ver2.0, among the changed roads which have been extracted as mentioned above, with the road R5 to be added according to the distribution request based on the user's desire.

In FIG. 5(d), L4, L5, L6 and L7 which are the changed roads, and the road R5 which is to be added from now on are shown. Among these roads, L5, L6, and L7 are the roads which were added when the map information was updated to that of map version of Ver2.0. Therefore, although these added roads exist in the map based on the map information of most up-to-date map version of Ver2.0 of the map DB stored in the up-to-date DB storage unit, they do not exist in the map based on the map information of map version of Ver1.0 held by the map information terminal 3.

Next, the map comparing unit 10 checks to see whether the map based on the map information of the map DB stored in the up-to-date DB storage unit 14 has a road equivalent to the road R5 which is to be added according to the distribution request (step S23). The map comparing unit 10 determines which one of the roads L5, L6 and L7 which were added when the map information was updated to most up-to-date map version of Ver2.0, among the roads shown in FIG. 5(d), is equivalent to the road R5 by calculating the matching degree between each of the roads and the road R5.

FIG. 8 is an explanatory drawing for explaining an example of determination logic about calculation of the matching degree between each of the roads, which were added when the map information was updated to most up-to-date map version of Ver2.0, and the road R5 which is to be added according to the distribution request. In FIG. 8, because it is clear that the road L7 greatly distant from the road R5, among the roads which were added when the map information was updated, does not match the road R5, the illustration of the road L7 is omitted. However, needless to say, the calculation of the matching degree between the road L7 and the road R5 can be carried out in the same way that the calculation of the matching degree between each of the roads L5 and L6 and the road R5. Furthermore, needless to say, the calculation of the matching degree between each of the roads L5 and L6 and the road R5 can be carried out by using any method other than a method as shown in FIG. 8 which will be explained as an example.

Now, the matching degree between the road L5 and the road R5 is expressed as S(R5-L5), and the area of a region formed between the road L5 and the road R5 is defined as the matching degree, as shown in FIG. 8. Similarly, the matching degree between the road L6 and the road R5 is expressed as S(R5-L6), and the area of a region formed between the road L6 and the road R5 is defined as the matching degree, as shown in FIG. 8.

These matching degrees S(R5-L5) and S(R5-L6) are expressed by the following equations (1) and (2), respectively.

[Equation 1]

$$S(R5-L5) = \text{Min}_{xy\Theta}\{s(f_{xy\Theta}(R5), L5) + W_{xy\Theta}\} \quad (1)$$

[Equation 2]

$$S(R5-L6) = \text{Min}_{xy\Theta}\{s(f_{xy\Theta}(R5), L6) + W_{xy\Theta}\} \quad (2)$$

In these equations, f(R5) is a function of translating and rotating (xyΘ) the road R5, and W is a function of adding a weight corresponding to the translation and the rotation. Furthermore, s(R, L) is the area enclosed by the line segments R and L each showing the corresponding road. In FIG. 8, a case of x=y=Θ=0 is shown for the sake of simplicity.

When it is clear from a comparison between S(R5-L5) and S(R5-L6) that S(R5-L5) is small, and is also smaller than a predetermined threshold Sth, the road R5 is identified as the road L5. In contrast, when S(R5-L5) is larger than the predetermined threshold Sth even if S(R5-L5) is clearly small than S(R5-L6), the map comparing unit determines that there is no road corresponding to the road R5 in the map based on the map information of the map DB stored in the up-to-date DB storage unit 14.

When, in step S23, identifying the road R5 as the road L5, the map comparing unit determines that the road L5 equivalent to the road R5 which is to be added according to the distribution request exists in the map based on the map information of the map DB stored in the up-to-date DB storage unit 14, and then advances to step S30.

Next, on the basis of a comparison with the map information of the map DB stored in the release DB storage unit 15, the map information having the map version matching the map version of the distribution request, the difference data creating unit 12 creates difference map data corresponding to the road L5 equivalent to the road R5 to be added (step S30). More specifically, the difference data creating unit calculates the difference between the map information equivalent to the map information of the map shown in FIG. 5(*e*) and the map information of the map shown in FIG. 5(*a*).

Because the road L5 equivalent to the road R5 which is to be added according to the distribution request exists in the map based on the map information of the map DB stored in the up-to-date DB storage unit 14, it can be considered that the degree of reliability of the map information is high from the viewpoint of the information about the road. Therefore, the whole control unit 7 sets the reliance status showing the degree of reliability of the difference map data created by the difference data creating unit 12, or more correctly, the degree of reliability of the map information held by the map information terminal 3 and which has been updated using the difference map data to 5 which is the highest degree of reliability, for example (step S31). Thus, the whole control unit 7 operates as a reliance status setting unit.

Next, the distributing unit 13 creates distribution data as shown in FIG. 4(*b*), and the communication unit 4 transmits the distribution data, as a reply to the distribution request received from the map information terminal 3, to the map information terminal 3 via the communication network 2 (step S32).

In the distribution data of FIG. 4(*b*) created by the distributing unit 13, the terminal ID information includes the specific terminal ID for identifying the map information terminal 3 which has transmitted the distribution request and the encryption key, and is the same as that included in the distribution request of FIG. 4(*a*). The map version of the distribution data is Ver1.0 which is the same as that shown by the version information of the map information of the map DB which the map information terminal 3 which has transmitted the distribution request stores in the map DB storage unit 24. In addition, the object type and the edit information are also the same as those which are included in the distribution request which the map information terminal 3 has transmitted, respectively. That is, the object type is the road one and the edit information is addition. The difference map data are created by the difference data creating unit 12 in step S30 and correspond to the road L5 equivalent to the road R5 to be added. In addition, the reliance status is 5 which the whole control unit 7 has set up in step S31.

After carrying out the processing in the above-mentioned way, the map distribution server 1*a* ends the operation flow in the case of identifying the road R5 as the road L5 in step S23 in response to the distribution request to add the road R5 from the map information terminal 3 (step S33).

Next, referring once again to FIG. 6, the operation of the map information terminal 3 when receiving the distribution data distributed from the map distribution server 1*a* after the operation of the map distribution server 1*a* is completed will be explained hereafter.

In the operation flow of the map information terminal 3 shown in FIG. 6, the map information terminal 3 checks whether the map distribution server 1*a* has made a reply to the distribution request transmitted to the map distribution server 1*a*, and, when no reply showing which the map distribution server 1*a* has received the distribution request comes from the map distribution server 1*a*, determines that the map information terminal 3 has not received any reply from the map distribution server (NO) and enters a standby state (step S15). In contrast with this, when the map distribution server 1*a* has made a reply showing that it has received the distribution request and the map information terminal 3 has received the reply, the map information terminal 3 determines that the map information terminal has received the reply from the map distribution server 1*a* (YES) and advances to step S16.

Next, the map information terminal 3 receives the distribution data as shown in FIG. 4(*b*) from the map distribution server 1*a* via the communication network 2 by using the terminal communication unit 21 (step S16). The terminal controlling unit 23 stores the distribution data received by the terminal communication unit 21 in the distribution data storage unit 25 of the terminal storage unit 20.

The terminal controlling unit 23 then updates the terminal map information which is the map information of the map DB stored in the map DB storage unit 24 according to the distribution data stored in the distribution data storage unit 25. That is, the terminal controlling unit 23 operates as an updating unit for updating the terminal map information. More specifically, after verifying that the map version included in the distribution data is Ver1.0 which is the same as that of the map information of the map DB stored in the map DB storage unit 24, the terminal controlling unit carries out a differential update of the map information of the map DB stored in the map DB storage unit 24 by using the difference map data included in the distribution data (step S17).

The terminal controlling unit 23 of the map information terminal 3 refers to the reliance status included in the distribution data stored in the distribution data storage unit 25, and performs navigation functions by using the map information of the map DB stored in the map DB storage unit 24 according to the reliance status (step S18). Because the reliance status is set to 5 which is the highest degree of reliability by the map distribution server 1*a*, the terminal controlling unit 23 which is the navigation unit of the map information terminal 3 can perform all the navigation functions, such as a search, guidance, a display, and a location, which the map information terminal 3 can carry out originally.

In the above-mentioned way, the series of operations, which are performed by the map information terminals 3 and the map distribution server 1*a*, including the operation of the map distribution server 1*a* creating and distributing the distribution data in response to the distribution request of adding the road R5 from the map information terminal 3 after determining that the road L5 equivalent to the road R5 exists in the map shown by the map information of the map DB stored in the up-to-date DB storage unit 14, and the operation of the map information terminal 3 receiving the distributed distribution data and updating the map information of the map DB stored in the map DB storage unit 24 according to the distribution data received are completed (step S19).

In contrast, when it is determined, in step S23, that there is no road equivalent to the road to be added in the map based on the map information held by the up-to-date DB storage unit 14, the map distribution server shifts from step S23 to step S24.

Although FIG. 9 shows an example of maps for explaining the operation of the map information terminal 3 and the operation of the map distribution server 1*a* in the map distribution system in accordance with Embodiment 1 of the present invention, FIG. 9 shows another example different from the example of the distribution request to add the road R5 shown in FIG. 5(*c*) which is sent by the map information terminal 3. More specifically, it is assumed that the distribution request from the map information terminal 3 is the one to add a road R8, and the road R8 to be added has a low degree of reliability by which the map distribution server 1 determines that no equivalent road exits in the map shown by the map information of the map DB stored in the up-to-date DB storage unit 14.

It is also assumed that a map DB including map information corresponding to the map shown in FIG. 5(*a*) is stored in the map DB storage unit 24 of the terminal storage unit 20 of the map information terminal 3, like in the case previously explained.

It is further assumed that a map DB including map information corresponding to the map shown in FIG. 5(*b*) is stored in the up-to-date DB storage unit 14 of the map distribution server 1*a*, like in the case previously explained. In addition, in FIG. 9, because the same reference numerals as those shown in FIG. 5 denote the same components or like components, the explanation of the components will be omitted hereafter.

FIG. 9(*a*) shows a map based on map information, for explaining the case in which the distribution request to add the new road R8 previously explained to the map based on the map information shown in FIG. 5(*a*) of the map information terminal 3 is created when the user operates the terminal handling unit 17 of the map information terminal 3 to perform a drawing operation using a cursor, for example. It is assumed that the road R8 to be added has a projected portion R8*a* in connection with a road L1 with which the road R8 intersects. In this case, it is assumed that the shape of a road which projects and comes to a dead end immediately has a lower degree of reliability as map information.

Furthermore, FIG. 9(*b*) is a view for explaining an operation of the map comparing unit 10 comparing the map based on the map information which has been edited according to the distribution request from the map information terminal 3 with the map shown in FIG. 5(*b*) based on the most up-to-date map information of the map DB stored in the up-to-date DB storage unit 14 of the map distribution server 1*a* to extract the changed roads and compare the road R8 to be added with only the changed roads.

In addition, FIG. 9(*c*) shows an example of a map for explaining an estimation process of estimating and correcting an element having a low degree of reliability as map information of the road to be added from the shape of this road. In the example shown in FIG. 9(*c*), the estimation process of estimating that because the road R8 has a shape of having the projected portion R8*a*, its degree of reliability is low as map information and the projected portion R8*a* is incorrect information, and then excluding the projected portion R8*a* from the road R8 is carried out. A road S8 is the one which the map information terminal acquires by performing this estimation process on the road R8.

In addition, FIG. 9(*d*) shows a map which the map information terminal 3 displays on the terminal display unit 22 according to updated map information which the map information terminal 3 has acquired by updating the map information of the map DB stored in the map DB storage unit 24 by using the distribution data transmitted from the map distribution server 1*a* in response to the distribution request to add the road R8 from the map information terminal 3. In FIG. 9(*d*), a road H8 is the one which the map information terminal has acquired by performing the estimation process of excluding the projected portion R8*a* having a low degree of reliability from the road R8 after determining that the road R8 to be added does not exist in the map information of the map DB stored in the up-to-date DB storage unit 14.

Because the road R8 which is to be added in the distribution request from the map information terminal 3 has a low degree of reliability by which the map distribution server 1*a* determines that no equivalent road exists in the map shown by the map information of the map DB stored in the up-to-date DB storage unit 14, the operation of the map distribution server 1*a* and the operation of the map information terminal 3, in the operation flow of the map distribution server 1*a* shown in FIG. 7, after the map distribution server 1*a*, in step S23, determines that the road to be added does not exist in the map information of the map DB stored in the up-to-date DB storage unit 14 and then advances to step S24 will be explained hereafter. Because the operation of the map distribution server 1*a* and the operation of the map information terminal 3 before step S23 are the same as those already explained, the explanation of the operations will be omitted hereafter.

In FIG. 7, the map distribution server, in step S24, performs the estimation process on the road R8 to be added according to the distribution request from the map information terminal 3. As shown in FIG. 4(*a*), various data about the road R8 including data showing that the object type is the road R8 and data showing that the edit information is addition are included in the distribution request as object data.

The road R8 to be added has the projected portion R8*a* which is an element having a low degree of reliability as map information, as mentioned above. Therefore, the road estimating unit 11 carries out the estimation process to acquire a road S8 having an improved degree of reliability in which the projected portion R8*a* having a low degree of reliability is removed from the road R8. In the road S8 acquired through the estimation process, a portion corresponding to the projected portion R8*a* shown in FIG. 9(*a*) is eliminated in connection with the road L1 intersecting with the road R8, as shown in FIG. 9(*c*).

In addition, the difference data creating unit 12, in step S24, creates difference map data corresponding to the road S8 acquired through the estimation process. On the basis of a comparison between the map information about the map shown in FIG. 9(*c*) and the map information of the map DB stored in the release DB storage unit 15, this map information having the map version matching the map version of the distribution request, the difference data creating unit creates the difference map data. More specifically, the difference data creating unit calculates the difference between the map information about the map shown in FIG. 9(*c*) and the map information about the map shown in FIG. 5(*a*).

Next, the degree of reliability is determined in step S25. The degree of reliability determined at this time is lower than that in the case in which the map distribution server determines YES in step S23, regardless of the judgment of if the map information about the road has a certain degree of reliability. This is because the road R8 to be added does not exist in the map based on the map information of the map DB stored in the up-to-date DB storage unit 14.

For example, when determining from the map information of the map DB stored in the up-to-date DB storage unit 14 that the road S8 which has been acquired through the estimation process performed on the road R8 to be added has an absolutely impossible position on the map, such as a position on the sea or a position under the surface of a lake, the map distribution server, in step S25, determines that the result of judging if the road to be added has a certain degree of reliability is NO, and sets the reliance status showing the degree of reliability of the map information about the road S8 to the lowest value, e.g., 0 (step S27). In contrast with this, when there is no inconsistency in the position of the road to be added, e.g., the road does not have an absolutely impossible position on the map, the map distribution server, in step S25, determines that the result of judging if the road to be added has a certain degree of reliability is YES, and sets the reliance status showing the degree of reliability of the map information about the road S8 to an intermediate value, e.g., 2 (step S26).

After the reliance status is set as mentioned above, the distributing unit 13, in step S32, creates distribution data as shown in FIG. 4(b), and the communication unit 4 transmits this distribution data, as a reply to the distribution request received from the map information terminal 3, to the map information terminal 3 via the communication network 2, like in the case of the already-explained operation flow.

After carrying out the processing in the above-mentioned way, the map distribution server 1a ends the operation flow in the case of, in step S23, determining that the road R8 does not exist in the map based on the map information of the map DB stored in the up-to-date DB storage unit 14 in response to the distribution request to add the road R8 from the map information terminal 3 (step S33).

Because the operation of the map information terminal 3 after receiving the distribution data distributed from the map distribution server 1a, which is done after the operation of the map distribution server 1a, is substantially the same as that in the case of the distribution request to add the road R5, an explanation focusing on a different portion will be made hereafter, referring once again to FIG. 6.

The map information terminal 3 receives the distribution data distributed from the map distribution server 1a (step S16), and updates the map information of the map DB stored in the map DB storage unit 24 according to the distribution data (step S17).

Next, the terminal controlling unit 23 of the map information terminal 3 imposes a restriction according to the value of the reliance status on the navigation functions and then performs the navigation functions. In the case of the distribution request to add the road R5, because the reliance status is set to 5 which is the highest value, the map information terminal 3 is enabled to perform all the navigation functions, such as a search, guidance, a display, and a location, which the map information terminal 3 can carry out originally.

In contrast with this, as explained above, when the reliance status is set 0 which is the lowest value because the road S8 has an absolutely impossible position on the map, for example, the map information terminal 3 is made to restrict the navigation functions which it can carry out only to a display, for example. In contrast, when the reliance status is set to an intermediate value, e.g., 2, the map information terminal 3 is made to restrict the navigation functions which it can carry out only to a display and a location, for example.

As mentioned above, because the map distribution system in accordance with Embodiment 1 of the present invention is constructed in such a way that in response to a distribution request from the map information terminal 3, the map distribution server 1a receives distribution data including map data which the user desires and which take the degree of reliability of the map data into consideration, and the map information terminal 3 updates the map information stored therein according to the distribution data, this embodiment offers an advantage of enabling the map information terminal to perform its navigation functions according to the degree of reliability of the map information.

In the above-mentioned embodiment, the case in which the edit information is addition is explained as an example. Even in the case in which the edit information is deletion or change, a similar process which is adapted for the edit information is carried out. For example, in the case in which the edit information is associated with deletion of the road R5, not with addition of the road R5, the map distribution server verifies whether or not the road R5 to be deleted is equivalent to the road L4 which exists in the map based on the map information of map version of Ver1.0, but does not exist in the map based on the map information of map version of Ver2.0.

Furthermore, although the case in which the object type of the object to be edited which is shown in the distribution request, is the road one is explained as an example, it is needless to say that a similar process is performed even in the case in which the object type is the facility one.

Furthermore, when creating a screen display of a map based on the updated map information as a navigation function, the map information terminal 3 can change a method of expressing the color of the road according to the value of the reliance status included in the distribution data. In this variant, there is provided an advantage of enabling the user to grasp what degree of reliability the updated map has at a glance. In this case, it is preferable that for the map information having the highest reliance status, the map information terminal creates a map screen display which is completely the same as a normal map screen display, and this is effective in facilitating the user's understanding. The user can simply recognize that the on-screen map differs from normally-displayed maps to be able to easily know that the on-screen map has a low degree of reliability.

Furthermore, the map information terminal 3 can be constructed in such a way as to enable the user to operate the terminal handling unit 17 thereof to set a correspondence between each possible value of the reliance status and one or more executable navigation functions. In the case in which the map information terminal is thus constructed in such a way as to enable the user to set a correspondence between each possible value of the reliance status and one or more executable navigation functions, the map information terminal 3 can be further suited to the user's taste.

Furthermore, the map information terminal 3 can be constructed in such a way as to, when the object type is the facility one in the distribution request transmitted from the map information terminal 3, enable the user to operate the terminal handling unit 17 to select a facility name or a mark for display from predetermined data and cause the map information terminal to create a distribution request. Therefore, the user can easily cause the map information terminal to create a distribution request.

In addition, the map distribution system can be constructed in such a way that a distributable point for restricting the number of times that the map information terminal can send a distribution request to enable the user to acquire a desired map is stored in either the terminal information storage unit 16 of the map distribution server 1a, or the terminal storage unit 20 of the map information terminal 3, a required point is predetermined for each distribution according to the type of the distribution, and the point according to the type of distribution is subtracted from the distributable point every time when the user causes the map information terminal to send the same distribution request to acquire a desired map. In the case in which the map distribution system is constructed in this way, the map distribution system can easily manage the user's distribution request. For example, when the distributable point becomes negative, the map distribution system can prevent the user from using the distribution service any more. Furthermore, the map distribution system can be constructed in such a way as to acquire information about a payment made by the user via the communication network 2, and increase the user's distributable point according to the user's payment.

In the above-mentioned embodiment, the case in which the distribution data include the map difference data about only the road L5 corresponding to the road R5 which the map information terminal has made a request to add using the distribution request, i.e., the road whose matching degree S is the smallest is explained. If the road L6 does not have a matching degree S with the road R5 which is equal to or higher than the threshold Sth even if the matching degree S is higher than that of L5, both the map difference data about the road L5 and the map difference data about the road L6 can be included in the distribution data while the reliance status is added to each map difference data. When the map difference data corresponding to a plurality of roads are included in the distribution data, the map information terminal 3 enables the user to operate the terminal handling unit 17 to select one or more roads from among the plurality of roads.

Furthermore, although the case in which the reliance status has an integer value, such as 0, 2, or 5, is explained above as an example, it is needless to say that the reliance status is not limited to such an integer value, and can be either a decimal fraction or a fraction as long as the value of the reliance status can represent the degree of reliability.

Embodiment 2

In the map distribution system in accordance with Embodiment 1 of the present invention, the storage unit 6a of the map distribution server 1a is comprised of the up-to-date DB storage unit 14, the release DB storage unit 15, and the terminal information storage unit 16. In contrast, in a map distribution system in accordance with Embodiment 2 of the present invention, a storage unit 6b of a map distribution server 1b (although not shown, hereafter, the map distribution server in accordance with Embodiment 2 is referred to as the map distribution server 1b in order to discriminate from the map distribution server 1a in accordance with Embodiment 1) differs from that in accordance with Embodiment 1 in that the storage unit 6b further includes an extended map DB unit 26 for storing an extended map DB consisting of photographic images, such as aerial photographs and satellite photographs.

In order to update the map information of the map DB stored in the up-to-date DB storage unit 14 with new contents, information gathering including a sequential survey is carried out. However, it takes a certain amount of time to carry out the information gathering and convert the acquired information into information about roads which consists of sequences of shape coordinate points, connection information about connection with existing roads, link numbers and so on, and information about facilities which consists of their names and positions and so on to form them into a database. Therefore, even though a new road or a new facility has been built or a road or a facility has been demolished, the map distribution system in accordance with Embodiment 1 cannot reflect this event into the map DB immediately.

In contrast with this, because what is necessary for the extended map DB in which aerial photographs and satellite photographs are formed into a database is just to take a photograph of such a road or facility and to register the photographic image into the database, there is a high possibility that the extended map DB can reflect more up-to-date information about roads and facilities as compared with the map DB stored in the up-to-date DB storage unit 14. However, in the case of using only a photographic image, it is necessary to judge a road or a facility only from the light and shade or the color of the photographic image, and the acquired judgment result is not adequate from the viewpoint of reliability as compared with the map information which the up-to-date DB storage unit 14 holds and which was acquired through an actual survey and information gathering.

Therefore, by using the extended map DB (database) consisting of photographic images, such as aerial photographs and satellite photographs, together with the map DB stored in the up-to-date DB storage unit 14, and setting a reliance status which is to be included in distribution data to be distributed to the map information terminal 3 according to the status of the use of the extended map DB, the map distribution server enables the map information terminal 3 to perform navigation functions according to the reliance status. Therefore, the user of the map information terminal 3 can use the navigation in which the information about the most up-to-date conditions of roads and facilities is reflected and which takes the degree of the reliability of the information of the distribution data into consideration.

More specifically, in a first case in which a road equivalent to a road to be added, for example, in the distribution request from the map information terminal 3 exists in the map DB of the up-to-date DB storage unit 14, the map distribution server has only to set the reliance status included in the distribution data which are sent back to the map information terminal 3 to a high value, while in a second case in which any road equivalent to the road to be added does not exist in the map DB of the up-to-date DB storage unit 14, but exits in the extended map DB of the extended map DB unit 26, the map distribution server has only to set the reliance status included in the distribution data which are sent back to the map information terminal to a lower value than that in the first case.

Figure 10:
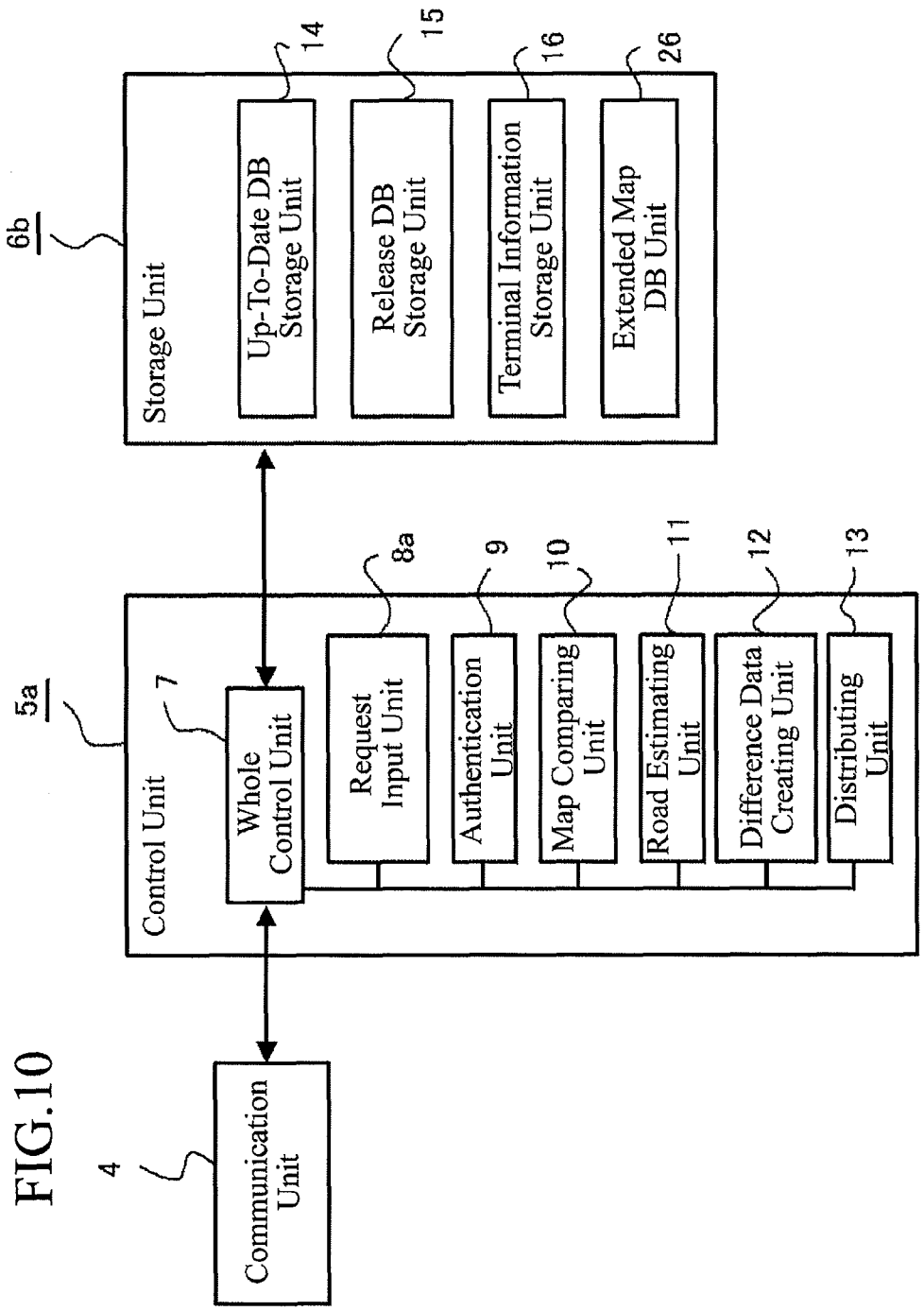
FIG. 10 is a block diagram showing the structure of a map distribution server 1b in a map distribution system in accordance with Embodiment 2 of the present invention.

FIG. 10 is a block diagram showing the structure of the map distribution server 1b in the map distribution system in accordance with Embodiment 2 of the present invention. In Embodiment 2, in the whole configuration of the map distribution system shown in FIG. 1, the map information terminal 3 and a communication network 2 are the same as those of Embodiment 1 while the structure of the map distribution server 1b differs from that of the map distribution server 1a of Embodiment 1. In FIG. 10, because the same reference numerals as those shown in FIG. 2 denote the same components or like components, the explanation of the components will be omitted hereafter.

As shown in FIG. 10, the storage unit 6b of the map distribution server 1b has the extended map DB unit 26 which is an extended map storage unit for storing the extended map DB consisting of photographic images, in addition to the up-to-date DB storage unit 14, the release DB storage unit 15, and the terminal information storage unit 16.

FIG. 11 is a view of an example of maps based on map information held by the map information terminal 3 and map information held by the map distribution server 1b, and an example of photographic images, such as aerial photographs and satellite photographs, in the extended map DB related to map information, in order to explain the operation of the map information terminal 3 and the operation of the map distribution server 1b in the map distribution system in accordance with Embodiment 2 of the present invention. In this figure, because the same reference numerals as those shown in FIGS. 5 and 9 denote the same components or like components, the explanation of the components will be omitted hereafter.

The extended map DB includes a photographic image of an aerial photograph shown, for example, in FIG. 11(a) and is stored in the extended map DB unit 26 which constructs the storage unit 6b of the map distribution server 1b. It is assumed that a map DB which includes map information about a map shown in FIG. 5(b) is stored in the up-to-date DB storage unit 14, like in the case of Embodiment 1. Furthermore, it is assumed that a map DB which includes map information about a map shown in FIG. 5(a) is stored in the map DB storage unit 24 of the map information terminal 3, like in the case of Embodiment 1.

The photographic image of FIG. 11(a) is an aerial photograph, for example, which is captured from the sky, and has a correspondence in position with a map based on the map information of the map DB stored in the release DB storage unit 15. Photographic images, like this photographic image, of aerial photographs and satellite photographs are formed into a database, and are stored as the extended map DB in the extended map DB unit 26.

Furthermore, FIG. 11(b) shows an image in a distribution request to add a road R9 from the map information terminal 3 in which the position of the road R9 is superimposed on the aerial photograph of FIG. 11(a) which is a photographic image in the extended map DB stored in the extended map DB unit 26. FIG. 11(b) is also a view for explaining an operation of a map comparing unit 10 comparing the road R9 with the aerial photograph of FIG. 11(a) which is a photographic image in the extended map DB stored in the extended map DB unit 26. The road R9 will be explained as an example of a road not having any projected portion having a low degree of reliability, unlike in the example of adding the road R8, which is explained in Embodiment 1.

In FIG. 11(b), road images L1p, L3p, L5p, L6p, and L7p correspond to roads L1, L3, L5, L6, and L7 shown in FIG. 5(b), respectively. In addition, road images L1p, L2p, and L3p correspond to roads L1, L2, and L3 shown in FIG. 5(a), respectively. Furthermore, the road which is to be added according to the distribution request is superimposed on the aerial photograph.

Furthermore, FIG. 11(c) shows a map in which a road S9 equivalent to the road R9 is added to the map having the map version of Ver1.0 which is the same as the map based on the map information of the map DB of the map DB storage unit 24 of the information terminal 3 shown in FIG. 5(a), and based on the map information of the map DB stored in the release DB storage unit 15 after the map comparing unit 10 compares the road R9 to be added with the aerial photograph which is a photographic image in the extended map DB stored in the extended map DB unit 26, and then, in step S55, determines that the road S9 equivalent to the road R9 exists in the aerial photograph which is a photographic image in the extended map DB.

In addition, FIG. 11(d) shows a map which is displayed on the terminal display unit 22 according to updated map information after the terminal controlling unit 23 of the map information terminal 3 updates the map information of the map DB stored in the map DB storage unit 24 by using the distribution data which have been transmitted by the map distribution server 1b in response to the distribution request to add the road R9 from the map information terminal 3. In FIG. 11(d), a road H9 is the one which is added to the map based on the map information of the map DB stored in the map DB storage unit 24 of the map information terminal 3 after the road R9 to be added is determined not to exist in the map information of the map DB stored in the up-to-date DB storage unit 14, the road R9 to be added is then compared with the aerial photograph in the extended map DB stored in the extended map DB unit, and the road S9 equivalent to the road R9 is determined to exist in the aerial photograph from the light and darkness of the photograph, and so on.

Figure 12:
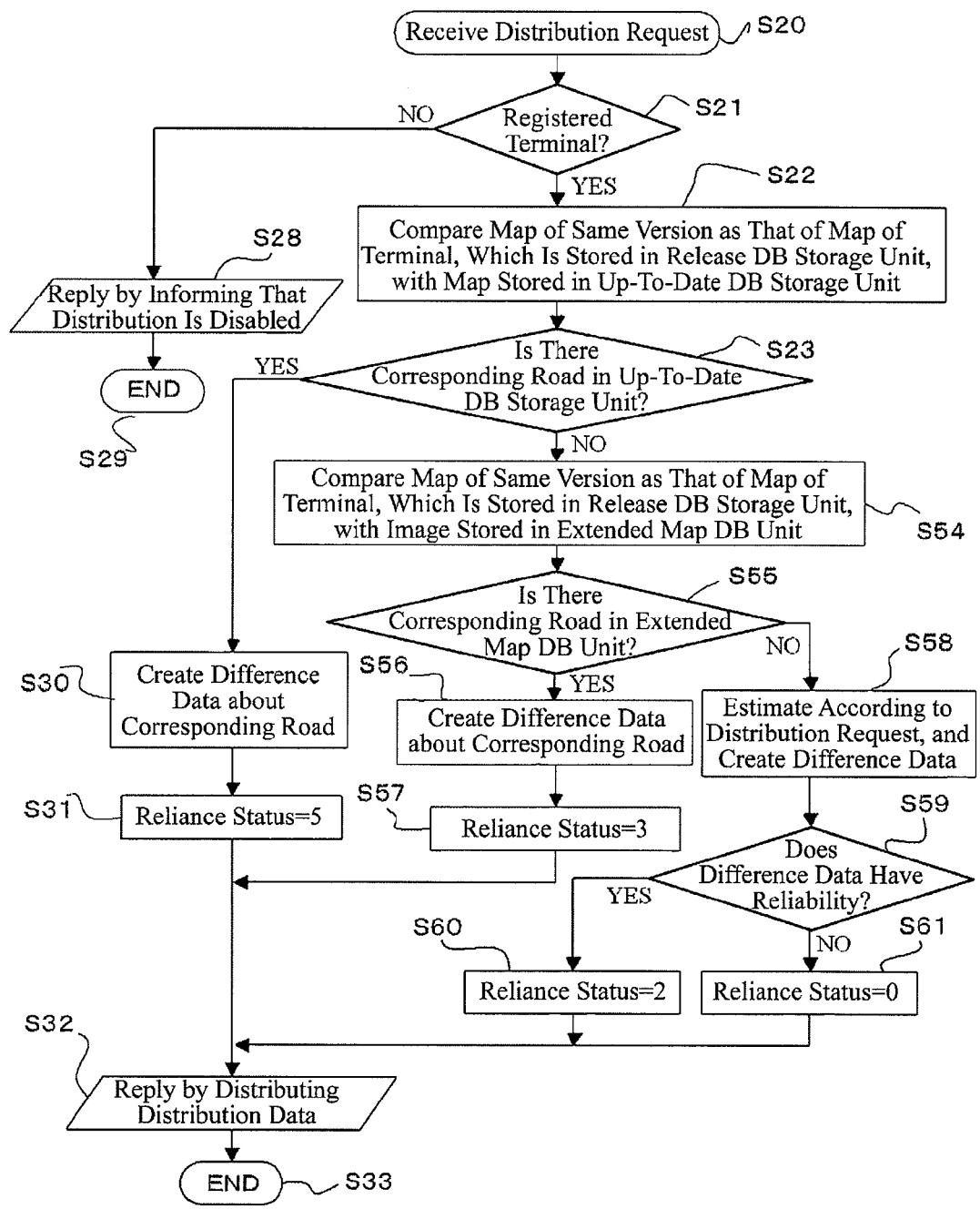
FIG. 12 is an operation flow view for explaining the operation of the map distribution server 1b in the map distribution system in accordance with Embodiment 2 of the present invention.

FIG. 12 is an operation flow view for explaining the operation of the map distribution server 1b in the map distribution system in accordance with Embodiment 2 of the present invention. Because the same reference numerals as those shown in FIG. 7 denote the same components or like components, the explanation of the components will be omitted hereafter.

Hereafter, the operation of the map distribution server 1b receiving a distribution request to add a road R8 from the map information terminal 3 will be explained with reference to FIGS. 10, 11 and 12, particularly focusing on an operation specific to Embodiment 2.

As shown in FIG. 12, in the operation of the map distribution server 1b in accordance with Embodiment 2, because the road R8 to be added according to the distribution request, in step S23, does not exist in the map based on the map information of the map DB which is stored in the up-to-date DB storage unit 14, the subsequent steps after the map distribution server has determined NO in step S23 differ from those in the case of Embodiment 1.

When the map comparing unit 10 which operates as a first comparing unit, in step S23, determines NO, the map distribution server advances to step S54. The map comparing unit 10, in step S54, selects the map information having the same map version as that in the distribution request from among the pieces of map information which were released in the past and which are stored in the release DB storage unit 15, and compares this selected map information with the map information about the photographic image in the extended map DB stored in the extended map DB unit 26.

More specifically, because the map version in the distribution request is set to Ver1.0, the map comparing unit 10 selects the map information whose map version is Ver1.0 from the pieces of map information stored in the release DB storage unit 15. Next, the map comparing unit 10 compares this map information of map version of Ver1.0 corresponding to the map shown in FIG. 5(a) with the map information which is the photographic image of the aerial photograph shown in FIG. 11(a) included in the extended map DB stored in the extended map DB unit 26. As a result, the map comparing unit can extract only the roads which have been changed in the map information about the photographic image held by the map distribution server 1b with reference to the map based on the map information held by the map information terminal 3. The photographic images, such as aerial photographs and satellite photographs, reflect more up-to-data conditions of roads and facilities than those provided by the map information of the map DB stored in the up-to-date DB storage unit 14. Therefore, there is provided an advantage of increasing the possibility that a road equivalent to the road R9 to be added is found by using the photographic image in the extended map DB stored in the extended map DB unit 26 even if a road equivalent to the road R9 to be added is not found, in step S23, in the map information of the map DB stored in the up-to-date DB storage unit 14.

The map comparing unit compares the changed roads which have been extracted as mentioned above, i.e., the roads, which are determined to have been changed in the map based on the map information about the photographic image stored in the map distribution server 1b with respect to the map based on the map information stored in the map information terminal 3, with the road R5 which is to be added according to the distribution request which the user has caused the map information terminal to make. In this case, the map comparing unit 10 operates as a second comparing unit.

As a result, when, in step S55, determining that the road S9 equivalent to the road R9 to be added according to the distribution request exists in the map associated with the photographic image in the extended map DB stored in the extended map DB unit 26, the map comparing unit 10 then advances to step S56.

The difference data creating unit 12, in step S56, creates difference map data corresponding to the road S9 equivalent to the road R9 to be added on the basis of a comparison with the map information of the map DB stored in the release DB storage unit 15 whose map version matches that of the distribution request. The difference map data is determined by calculating the difference between the map information about the map shown in FIG. 11(*c*) and the map information about the map shown in FIG. 5(*a*).

Next, a reliance status is set in step S57. Although no road equivalent to the road R6 to be added exists in the map based on the map information of the map DB stored in the up-to-date DB storage unit 14, a road equivalent to the road R6 to be added exists in the map based on the map information which consists of the photographic image in the extended map DB stored in the extended map DB unit 26. Therefore, the reliance status in this second case is set a value which is lower than that (the reliance status=5) in the first case in which the road exists in the map DB of the up-to-date DB storage unit 14, but higher than that in the third case in which the road does not exist in the extended map DB. For example, the reliance status in the second case is set to 3.

After the reliance status is set as mentioned above, a distributing unit 13, in step S32, creates distribution data as shown in FIG. 4(*b*), and a communication unit 4 transmits this distribution data, as a reply to the distribution request received from the map information terminal 3, to the map information terminal 3 via the communication network 2, like in the case of the already-explained operation flow.

After carrying out the processing in the above-mentioned way, the map distribution server 1*b* ends the operation flow in the second case of, in step S23, determining that the road R9 does not exist in the map based on the map information of the map DB stored in the up-to-date DB storage unit 14 in response to the distribution request to add the road R9 from the map information terminal 3, but, in step S55, determining that the road S9 equivalent to the road R9 exists in the map based on the map information which consists of the photographic image of the extended map DB stored in the extended map DB unit 26 (step S33).

Next, as to the operation flow of the map distribution server 1*b* in the third case of, in step S23, determining that the road R9 does not exist in the map based on the map information of the map DB stored in the up-to-date DB storage unit 14 in response to the distribution request to add the road R9 from the map information terminal 3, and, in step S55, determining that the road S9 equivalent to the road R9 does not exist in the map based on the map information which consists of the photographic image of the extended map DB stored in the extended map DB unit 26, step S55 and subsequent steps different from those in the second case will be explained hereafter.

Now, the map comparing unit 10 of the map distribution server 1*b*, in step S55, determines that the road S9 equivalent to the road R9 does not exist in the map based on the map information which consists of the photographic image of the extended map DB stored in the extended map DB unit 26, and then advances to step S58.

The map comparing unit, in step S58, performs an estimation process on the road R9 to be added according to the distribution request from the map information terminal 3. As shown in FIG. 4(*a*), various data about the road R9 including data showing that the object type is the road R9 and data showing that the edit information is addition are included in the distribution request as object data.

Because the road R9 to be added does not have any projected portion, unlike the road R8 explained in Embodiment 1, the map comparing unit does not fully perform the estimation process on the road R9 to be added, but performs a needed estimation process on the road R9 to be added according to information including the light and shade, color, and so on of the photographic image in the extended map DB stored in the extended map DB unit 26.

Furthermore, a difference data creating unit 12, in step S58, creates difference map data corresponding to the road acquired through the estimation process. Because the creation of the difference map data is the same as that explained above, the explanation of the creation of the difference map data will be omitted.

Next, the degree of reliability is determined in step S59. As a matter of course, the degree of reliability determined at this time is lower than that in the first case in which the map distribution server determines YES in step S23, regardless of the judgment of if the map information about the road has a certain degree of reliability, and the degree of reliability is further lower than that in the second case in which the map distribution server determines YES in step S55. This is because the road R9 to be added does not exist in the map based on the map information which consists of the photographic image in the extended map DB stored in the extended map DB unit 26.

For example, when determining from the map information which consists of the photographic image in the extended map DB stored in the extended map DB unit 26 that the road which has been acquired through the estimation process performed on the road to be added has an absolutely impossible position on the map, such as a position on the sea or a position under the surface of a lake, the map distribution server, in step S59, determines that the result of judging if the road to be added has a certain degree of reliability is NO, and sets the reliance status showing the degree of reliability of the map information about the road to the lowest value, e.g., 0 (step S61). In contrast with this, when there is no inconsistency in the position of the road to be added, e.g., the road does not have an absolutely impossible position on the map, the map distribution server, in step S59, determines that the result of judging if the road to be added has a certain degree of reliability is YES, and sets the reliance status showing the degree of reliability of the map information about the road to a bit higher value, e.g., 2 (step S60).

After the reliance status is set as mentioned above, the distributing unit 13, in step S32, creates distribution data as shown in FIG. 4(*b*), and the communication unit 4 transmits this distribution data, as a reply to the distribution request received from the map information terminal 3, to the map information terminal 3 via the communication network 2, like in the case of the already-explained operation flow.

After carrying out the processing in the above-mentioned way, the map distribution server 1*b* ends the operation flow in the case of, in step S55, determining that the road R9 does not exist in the map based on the map information which consists of the photographic image in the extended map DB stored in the extended map DB unit 26 in response to the distribution request to add the road R9 from the map information terminal 3 (step S33).

As explained above, in the map distribution system in accordance with Embodiment 2 of the present invention, the map distribution server 1*b* is further provided with the extended map DB unit 26 for storing the extended map DB consisting of photographic images, such as aerial photographs and satellite photographs, and, when a requested content associated with a distribution request from the map information terminal 3 is compared with the map DB stored in the up-to-date DB storage unit 14, and the requested content does not exist in the map DB, further compares the requested content with the extended map DB consisting of the photographic images stored in the extended map DB26. Therefore, the map information terminal can provide navigation which reflects more up-to-data conditions of roads and facilities than those provided by the map information of the map DB stored in the up-to-date DB storage unit and which takes the degree of reliability of the distribution data into consideration.

The map information terminal 3 carries out navigation functions according to the reliance status included in the distribution data transmitted thereto. Like in the case of Embodiment 1, when the reliance status is set to 5 which is the highest value, the map information terminal 3 is enabled to perform all the navigation functions, such as a search, guidance, a display, and a location, whereas when the reliance status is set to 2, the map information terminal 3 is made to restrict the navigation functions which it can carry out only to a display and a location, for example. In addition, when the reliance status is set to 0 which is the lowest value, the map information terminal 3 is made to restrict the navigation functions which it can carry out only to a display. Furthermore, when the reliance status is set to 3, the map distribution system can enable the map information terminal 3 to perform all the navigation functions without discriminating this case from the case in which the reliance status is set to 5 because a content corresponding to the content of the distribution request exists in the extended map DB which consists of the photographic images. As an alternative, the map distribution system can discriminate the case in the reliance status is set to 3 from the case in which the reliance status is set to 5 to impose a certain function restriction on the map information terminal 3, or display that there is no function restriction, but the reliance status is not the highest value on the terminal display unit 22 to notify the user to that effect.

Furthermore, when making a map update according to the distribution data transmitted from the distribution map server 1b, the map information terminal 3 can display information showing the degree of reliability of the updated content on the terminal display unit 22 according to the reliance status included in the distribution data regardless of the value of the reliance status. In this case, there is provided an advantage of enabling the user of the map information terminal 3 to know the degree of reliability of the content of the distribution request.

Embodiment 3

In the map distribution systems in accordance with of Embodiments 1 and 2 of the present invention, when the user of the map information terminal 3 causes the map information terminal to create a desired distribution request, the map information terminal displays a map based on the map information held by the map information terminal 3 on the terminal display unit 22, and then displays a map edit menu according to the user's operation on the terminal handling unit 17. The user performs an editing operation on the map based on the map information held by the map information terminal 3 in order to cause the map information terminal to create a distribution request while watching the map edit menu. More specifically, the map information terminal 3 has to create a request edit screen display required to edit and create the distribution request.

In contrast with this, in a map distribution system in accordance with Embodiment 3 of the present invention, a map information terminal 3 accesses a map distribution server 1a or 1b, and displays, as a WEB screen, a request edit screen, which the map information terminal 3 has created according to map information held by the map distribution server 1a or 1b, on a terminal display unit 22 thereof by using a browser.

The map information terminal 3 in accordance with Embodiment 3 directly performs neither a process of creating map display data required in order to create a distribution request, and the request edit screen, such as a map edit menu screen, nor an editing process by itself.

Because the map information terminal 3 accesses the map distribution server 1a or 1b to send information required for such a process to the map distribution server, and the map distribution server 1a or 1b carries out the process, the load on the map information terminal 3 can be reduced. Because the map information terminal 3 can thus reduce the load imposed thereon, the map information terminal 3 can be downsized and can reduce its power consumption.

Furthermore, because the map distribution server 1c creates the map edit screen display, the map information terminal can easily use not only a map DB stored in a release DB storage unit 15 but also a map DB stored in an up-to-date DB storage unit 14. When the map information terminal 3 uses the map DB stored in the up-to-date DB storage unit 14, the map distribution server needs to specially send the map information of the map DB to the map information terminal 3 via a communication network 2.

Figure 13:
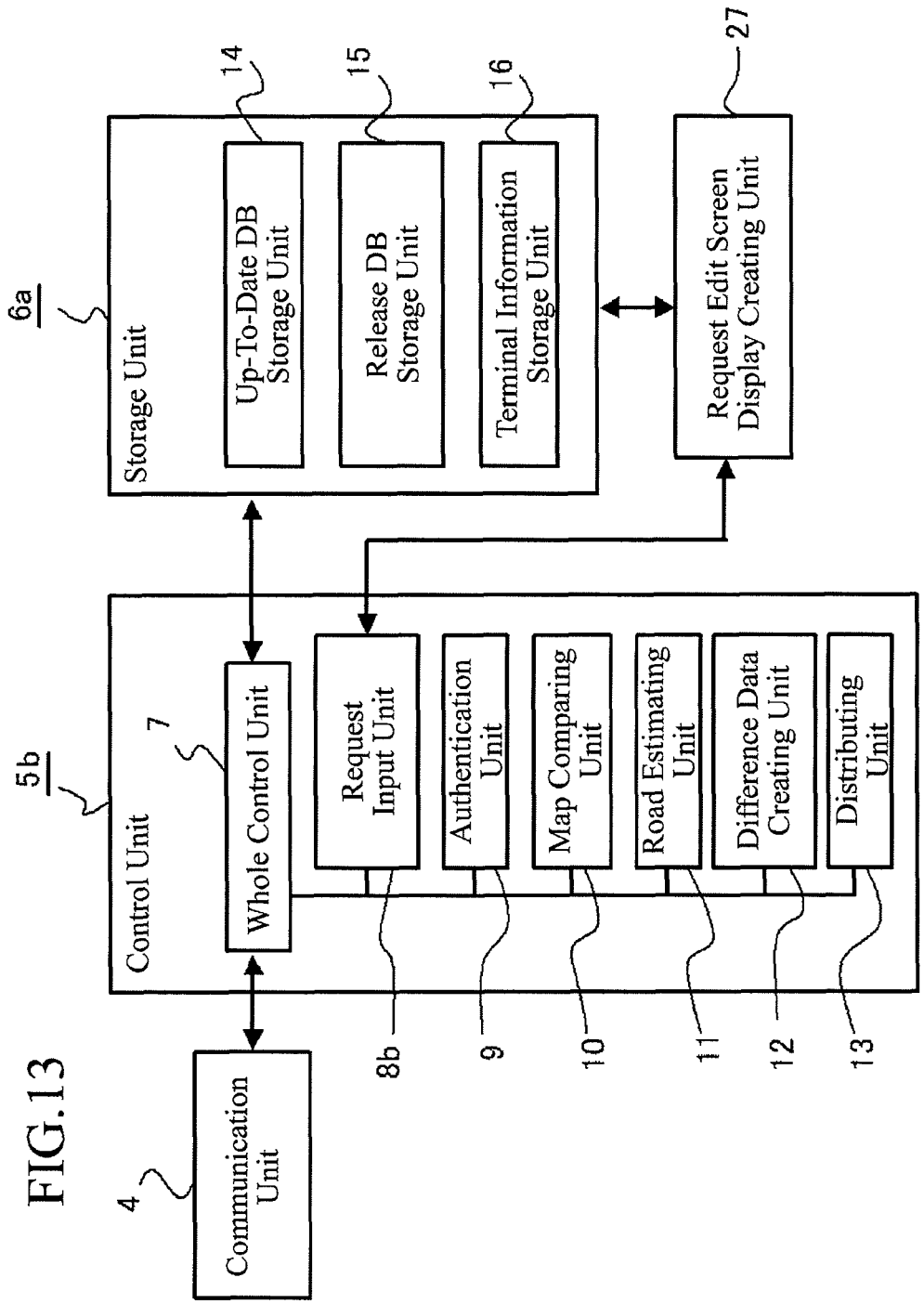
FIG. 13 is a block diagram showing the structure of a map distribution server 1c in a map distribution system in accordance with Embodiment 3 of the present invention.

FIG. 13 is a block diagram showing the structure of the map distribution server 1c in the map distribution system in accordance with Embodiments 3 of the present invention. In Embodiment 3, in the whole configuration of the map distribution system shown in FIG. 1, the map information terminal 3 and the communication network 2 are the same as those in accordance with any one of Embodiments 1 and 2, the map distribution server 1c differs from the map distribution server 1a in accordance with Embodiment 1 and the map distribution server 1b in accordance with Embodiment 2 in that the map distribution server 1c has a request edit screen display creating unit 27. The other structural components of the map distribution server are the same as those of the map distribution servers mentioned above. In FIG. 13, because the same reference numerals as those shown in FIGS. 1 and 2 denote the same components or like components, the explanation of the components will be omitted hereafter.

As shown in FIG. 13, the map distribution server 1c is provided with the request edit screen display creating unit 27 for creating data about a distribution request edit screen display required in order for the map information terminal 3 to create a distribution request using a browser. The request edit screen display creating unit 27 creates screen display data for browser by using map information or the like held by a storage unit 6a in response to a request to transmit the screen display data from the browser of the map information terminal 3. The screen display data for browser are then inputted to a request input unit 8b, and are transmitted from a communication unit 4 to the map information terminal 3 via the communication network 2 under the control by a whole control unit 7.

The map information terminal 3 which has received the screen display data for browser displays a distribution request edit screen required to edit and create a distribution request on the terminal display unit 22 by using the browser.

Figure 14:
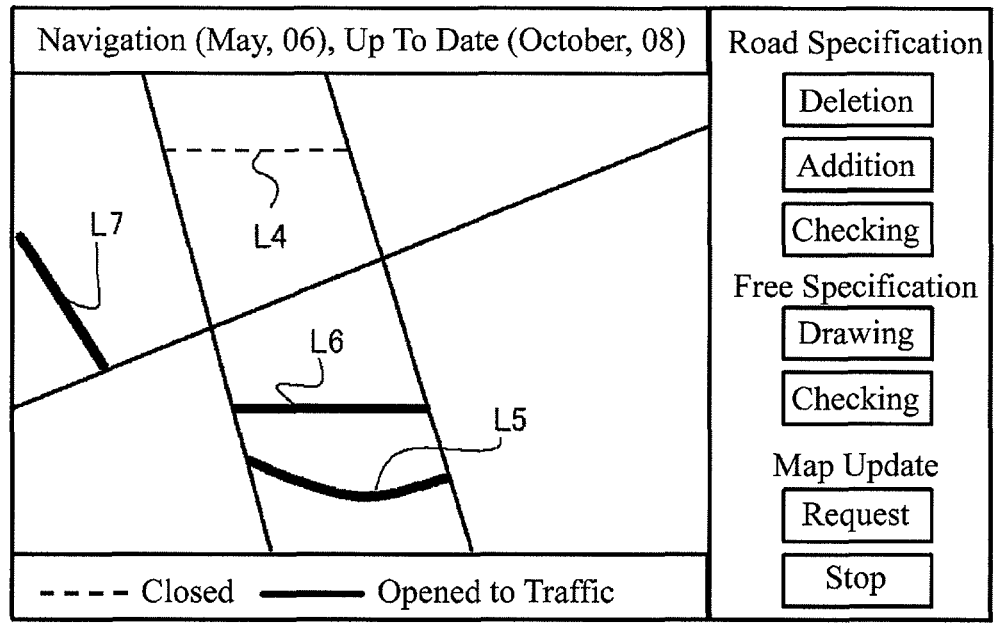
FIG. 14 is an example of a requested edit screen display which is created by a requested edit screen display creating unit 27 of the map distribution server 1c, and which is displayed on a terminal display unit 22 of a map information terminal 3 by using a browser.

FIG. 14 shows an example of the request edit screen which the request edit screen display creating unit 27 of the map distribution server 1c has created, and which the map information terminal 3 has displayed on the terminal display unit 22 by using the browser. On the request edit screen, a display with a date; "Navigation (May, 06)" which is an example of the map version of the map information of the map DB stored in the map DB storage unit 24 of the map information terminal 3, a display with a date; "Up-to-date (October, 08)" which is an example of the map version of the map information of the map DB stored in the up-to-date DB storage unit 14 of the map distribution server 1c, etc. are shown.

Edit command buttons associated with the user's operation on the browser are displayed in a right portion of the request edit screen of FIG. 14. The user is allowed to operate a terminal handling unit 17 of the map information terminal 3 to edit and create a distribution request by using these edit command buttons.

In a central portion of the request edit screen, a map which the request edit screen creating unit 27 of the map distribution server 1c has created on the basis of the map information of the map DB stored in the release DB storage unit 15 of the map distribution server 1c, the map information having the same map version as the map information of the map DB stored in the map DB storage unit 24 of the map information terminal 3, and the map information of the map DB stored in the up-to-date DB storage unit 15 is displayed. In the map shown in the central portion of FIG. 13, roads L5, L6, and road L7 each denoted by a thick line are the ones which do not exist in the map based on the map information of map version of Ver1.0 held by the map information terminal 3, but have been newly opened to traffic, and which are newly added to the map based on the map information of map version of Ver2.0 held by the up-to-date DB storage unit 15 of the map distribution server 1c. In contrast, a road L4 denoted by a dashed line is the one which exists in the map based on the map information of map version of Ver1.0, but has been closed, and which does not exist in the map based on the map information of most up-to-date map version of Ver2.0. As mentioned above, the map is displayed in such a way that the user can discriminate differences between map versions.

Although each road which has been newly opened to traffic is denoted by a thick line in FIG. 14, needless to say that each road which has been newly opened to traffic can be displayed by using another display method for the sake of making it legible. For example, each road which has been newly opened to traffic can be denoted by a double line.

Hereafter, it is assumed that the user watches the request edit screen shown in FIG. 14, and then desires to add a road L5 to the map based on the map information held by the map information terminal 3. The user can specify the road L5 by using a cursor or the like after pushing down an additional button among the edit command buttons, for example. Because the specified road L5 then changes its color, the user pushes down a confirmation button and further pushes down a request button to cause the map information terminal 3 to create a distribution request to add the road L5 to the map information held by the map information terminal 3. This distribution request is transmitted from the map information terminal 3 to the map distribution server 1c, and the map distribution server 1c creates difference map data to add the road L5 in response to the distribution request and then distributes the difference map data, as well as a reliance status and so on, to the map information terminal 3 as distribution data. A stop button shown in the figure is the one for stopping the editing operation for creation of a distribution request.

Furthermore, like in the case of the road R8 explained in Embodiment 1, when the user desires to add a road for which any equivalent road exists neither in the map information of the map DB stored in the release DB storage unit 15 nor in the map information of the map DB stored in the up-to-date DB storage unit 14, the user is allowed to push down a drawing button shown in FIG. 14 and then move a cursor or the like on the screen to draw a line. Because a map screen on which the road R8 as shown in FIG. 9(a) is drawn is displayed in the central portion of the request edit screen, the user can push down the confirmation button and the request button to cause the map information terminal to create a distribution request. This distribution request is transmitted from the map information terminal 3 to the map distribution server 1c, and the map distribution server 1c creates difference map data to add the road R8 in response to the distribution request and then distributes the difference map data, as well as the reliance status and so on, to the map information terminal 3 as distribution data.

Although the above explanation of Embodiment 3 is made by taking the example of the distribution request of Embodiment 1 as an example, needless to say that the same advantages are provided even when this embodiment is applied to a map distribution system comprised of a map distribution server 1b equipped with an extended map DB unit 26 like the extended map DB unit in accordance with Embodiment 2. In this case, the request edit screen display creating unit 27 can create a screen display in which a photographic image of an aerial photograph as shown in FIG. 11(a) and a request edit screen as shown in FIG. 14 are superimposed in response to the user's request so as to enable the user to draw a line easily. By doing in this way, the map distribution system can improve the user usability.

Embodiment 4

In the map distribution system in accordance with Embodiment 3 of the present invention, the request edit screen display creating unit 27 is disposed in the map distribution server 1c, and the map information terminal 3 is allowed to access the map distribution server 1c by using a browser. As an alternative, a PC (personal computer) terminal 28 disposed at home, for example, can be allowed to access a map distribution server 1a, 1b or 1c via the Internet to create a distribution request. In the case in which the map information terminal 3 is not a portable one, but is fixed to a vehicle, the user has to get on the vehicle on purpose in order to cause the map information terminal to edit and create a distribution request. In contrast, a map distribution system according to this Embodiment 4 enables the user to cause the PC terminal to create a distribution request at home, thereby providing improved convenience.

Figure 15:
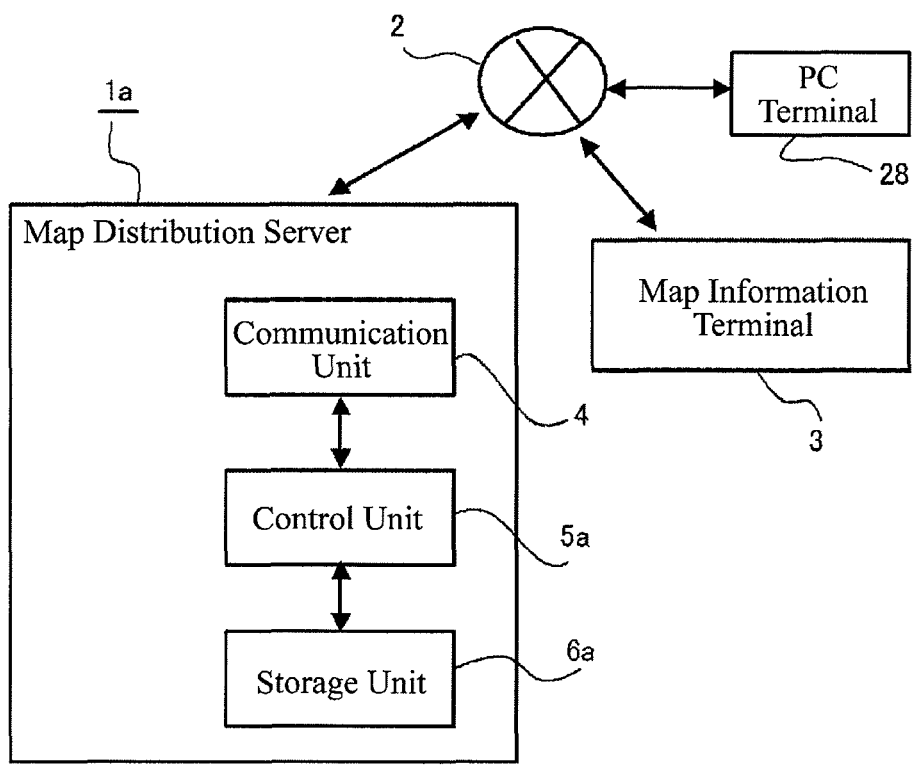
FIG. 15 is a block diagram showing the structure of a map distribution system in accordance with Embodiment 4 of the present invention.

FIG. 15 is a block diagram showing the structure of the map distribution system in accordance with Embodiment 4 of the present invention. In FIG. 15, because the same reference numerals as those shown in FIG. 1 denote the same components or like components, the explanation of the components will be omitted hereafter.

As shown in FIG. 15, the PC terminal 28 installed at a location providing good convenience for the user, such as at home, for accessing a map distribution server 1a, is connected to a communication network 2. The PC terminal 28 can access the map distribution server 1a and the map information terminal 3 via the communication network 2, and the map distribution server 1a and the map information terminal 3 can access the PC terminal 28 via the communication network 2.

An operation of the PC terminal 28 accessing the map distribution server 1a to carry out editing and creation of a distribution request is the same as that of the map information terminal 3 in accordance with Embodiment 3.

Furthermore, the PC terminal 28 can download the distribution data which are distributed from the map distribution server 1a in response to the distribution request transmitted from the PC terminal 28, and can deliver the distribution data to the map information terminal 3 by using a storage medium. As an alternative, the map information terminal 3 can access the PC terminal 28 to acquire the distribution data which the PC terminal 28 has downloaded from the map distribution server 1*a*.

Embodiment 5

In the map distribution system in accordance with any one of Embodiments 1 to 4 of the present invention, the distribution data are transmitted and received via communications of digital data via the communication network 2. In contrast, Embodiment 5 is characterized in that the user fills in a distribution request freehand on the basis of a map described on paper, and sends the distribution request to a map distribution server by e-mail, fax, or the like.

In this case, an operator who is a person is needed for the map distribution server 1*d*, and, after the operator authenticates the user by using a terminal number or a user name which is written in the distribution request freehand or by a printer, the operator uses a request edit screen and an operation input unit disposed in the map distribution server 1*d* to perform a manual operation of inputting the distribution request to the map distribution server 1*d*. The request edit screen display created at this time is the same as that shown in FIG. 14.

Because the user has only to fill in the distribution request on the map described on paper freehand, this map distribution system offers convenience of enabling the user to describe various small request items in the distribution request. A PC terminal 28 can access the map distribution server 1*d* to acquire the created distribution data, like that in accordance with Embodiment 4. A map information terminal 3 can alternatively access the map distribution server 1*d* to acquire the created distribution data, like that in accordance with Embodiment 1.

Embodiment 6

In a map distribution system in accordance with Embodiment 6 of the present invention, the user is enabled to use a map information terminal 3 or a PC terminal 28 to pay electronic money in the form of points for distribution for a usage fee in the case of sending a distribution request to a map distribution server 1*a*, 1*b*, 1*c*, or 1*d*. In this case, the map information terminal 3 is provided with a point storage unit for storing available distributable points. As a method of purchasing points for distribution, there is provided a method of enabling the user to purchase a storage medium for storing predetermined points, and insert the storage medium into a connecting terminal of the map information terminal 3 to add the points stored in the storage medium to the distributable points stored in the point storage unit of the map information terminal 3. The points stored in the storage medium are deleted after the points stored in the storage medium are added to the distributable points.

As mentioned above, because the map distribution system enables the user to purchase a storage medium which serves as electronic money, for storing predetermined points for distribution, and use these points to pay for a usage fee for the user's distribution request, the map distribution system provides an advantage of providing high user convenience.

EXPLANATION OF REFERENCE CHARACTERS

1*a* Map distribution server
2 Communication network
3 Map information terminal
4 Communication unit
6*a* Storage unit
6*b* Storage unit
7 Whole control unit
10 Map comparing unit
12 Difference data creating unit
13 Distributing unit
14 Up-to-date DB storage unit
15 Release DB storage unit
17 Terminal handling unit
21 Terminal communication unit
23 Terminal controlling unit
24 Map DB storage unit
25 Distribution data storage unit
26 Extended map DB unit

The invention claimed is:

1. A map distribution server comprising:
a receiving unit for receiving a distribution request including edit request information showing editorial contents of map information requested by a user and a version of terminal map information held by a map information terminal;
a first map information storage unit for holding a plurality of pieces of already-released first map information;
a second map information storage unit for holding second map information which is most up to date, the second map information including yet-to-be-released map information;
a first comparing unit for extracting first map information of a same version as said terminal map information from among said plurality of pieces of first map information, and for making a comparison whether said edit request information is included in difference information between said extracted first map information and said second map information to output a first comparison result showing a matching degree between the difference information and the edit request information;
a creating unit for creating difference map data according to said distribution request on a basis of said first comparison result and said first map information of the same version; and
a transmitting unit for transmitting distribution data which is said difference map data to said map information terminal.

2. The map distribution server according to claim 1, wherein the first comparing unit compares the difference information with the edit request information by calculating a matching degree showing a degree of match between them based on a difference between road shapes.

3. A map distribution server comprising:
a receiving unit for receiving a distribution request including edit request information showing editorial contents of map information requested by a user and a version of terminal map information held by a map information terminal;
a first map information storage unit for holding a plurality of pieces of already-released first map information;
a second map information storage unit for holding second map information which is most up to date, the second map information including yet-to-be-released map information;
a first comparing unit for extracting first map information of a same version as said terminal map information from among said plurality of pieces of first map information, and for making a comparison whether said edit request information is included in difference information between said extracted first map information and said second map information to output a first comparison result showing a matching degree between the difference information and the edit request information;

an extended map storage unit for holding extended map information comprised of photographic images corresponding to said first map information of the same version;

a second comparing unit for, when the first comparison result indicates that the edit request information is not included in the difference information, making a comparison with the edit request information included in said distribution request by using said extracted first map information and said extended map information to output a second comparison result;

a creating unit for creating difference map data according to said distribution request on a basis of said second comparison result and said first map information of the same version; and a transmitting unit for transmitting distribution data which is said difference map data to said map information terminal.

4. The map distribution server according to claim 3, wherein the first comparing unit compares the difference information with the edit request information by calculating a matching degree showing a degree of match between them based on a difference between road shapes.

5. The map distribution server according to claim 1 or 3, wherein the map information terminal is mounted in a vehicle, and the receiving unit receives the distribution request from another terminal which is placed outside said vehicle.

6. The map distribution server according to claim 5, wherein the other terminal placed outside the vehicle is a PC terminal.

7. The map distribution server according to claim 1 or 3, wherein said map distribution serve further includes an authentication unit for verifying registration of the map information terminal according to specific terminal ID information set to said map information terminal, and, when said authentication unit verifies that said map information terminal is a registered terminal, the map distribution server distributes the distribution data to said map information terminal, whereas when said authentication unit verifies that said map information terminal is not a registered terminal, said map distribution server sends a reply showing that said map distribution server cannot distribute the distribution data to said map information terminal.

8. The map distribution server according to claim 1 or 3, wherein said map distribution server further includes a point storage unit for storing distributable points to restrict a number of times that the map information terminal uses the distribution request, and the map distribution server decrements said distributable points according to a number of times that said map information terminal has sent the distribution request, and, when said distributable points become equal to zero, disables the distribution to said map information terminal.

9. A map information terminal comprising:

a terminal map information storage unit for storing terminal map information;

a terminal handling unit for inputting edit request information showing editorial contents of said terminal map information;

a transmitting unit for transmitting the inputted edit request information to a distribution server;

a receiving unit for receiving, as a reply to said edit request information transmitted to the distribution server, difference map data which are difference data corresponding to said terminal map information from the map distribution server;

an updating unit for making a differential update of said terminal map information according to the difference map data included in said distribution data; and a navigation unit for carrying out a navigation function for performing map display.

10. The map information terminal according to claim 9, wherein the map information terminal further includes a point storage unit for storing distributable points to restrict a number of times that the map information terminal uses the distribution request transmitted by the transmitting unit, and decrements said distributable points according to a number of times that said map information terminal has used said distribution request, and, when said distributable points are lost, transmission of the distribution request is disabled.

11. The map information terminal according to claim 10, wherein the map information terminal further includes a connecting terminal to which a storage medium for storing predetermined points is connected, and, when said storage medium is connected to said connecting terminal, said predetermined points are added to the distributable points stored in the point storage unit.

* * * * *